(12) United States Patent
Wang et al.

(10) Patent No.: US 12,034,821 B2
(45) Date of Patent: Jul. 9, 2024

(54) COMPUTING AWARE-SESSION MANAGEMENT METHOD AND COMMUNICATION APPARATUS

(71) Applicant: HUAWEI TECHNOLOGIES CO., LTD., Shenzhen (CN)

(72) Inventors: Yan Wang, Shanghai (CN); Weihua Hu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/323,456

(22) Filed: May 25, 2023

(65) Prior Publication Data

US 2023/0300210 A1    Sep. 21, 2023

Related U.S. Application Data

(63) Continuation of application No. PCT/CN2021/133659, filed on Nov. 26, 2021.

(30) Foreign Application Priority Data

Nov. 28, 2020    (CN) .......................... 202011367986.8

(51) Int. Cl.
*H04L 67/51* (2022.01)
*H04L 67/146* (2022.01)

(52) U.S. Cl.
CPC ............ *H04L 67/51* (2022.05); *H04L 67/146* (2013.01)

(58) Field of Classification Search
CPC .............................. H04L 67/51; H04L 67/146
USPC ......................................................... 709/203
See application file for complete search history.

(56) References Cited

U.S. PATENT DOCUMENTS

| 10,284,381 | B1* | 5/2019 | Weiner ................ H04L 12/1886 |
| 2011/0283013 | A1* | 11/2011 | Grosser ................ H04L 61/103 709/232 |
| 2019/0141495 | A1* | 5/2019 | Jha ....................... H04W 40/026 |
| 2022/0417122 | A1* | 12/2022 | Chou .................. H04L 41/5051 |

* cited by examiner

*Primary Examiner* — Wing F Chan
*Assistant Examiner* — Leon Y Tseng
(74) *Attorney, Agent, or Firm* — HAUPTMAN HAM, LLP

(57) ABSTRACT

A computing aware-session management method includes sending, by a second computing aware-user plane function, computing service information to a first computing aware-user plane function. The computing service information is useable to indicate that an edge computing node associated with the second computing aware-user plane function is configured to support a first computing service. The computing aware-session management method further includes receiving, by the second computing aware-user plane function, a service request packet from the first computing aware-user plane function. The service request packet is useable for requesting the first computing service. The computing aware-session management method further includes sending, by the second computing aware-user plane function, the service request packet to the edge computing node.

20 Claims, 12 Drawing Sheets

COMPUTING AWARE-SESSION MANAGEMENT METHOD AND COMMUNICATION APPARATUS

CROSS-REFERENCE TO RELATED APPLICATIONS

This application is a continuation of International Application No. PCT/CN2021/133659, filed on Nov. 26, 2021, which claims priority to Chinese Patent Application No. 202011367986.8, filed on Nov. 28, 2020, the disclosures of the aforementioned applications are hereby incorporated by reference in their entireties.

TECHNICAL FIELD

This application relates to the field of wireless communication technologies, and in particular, to a computing aware-session management method and a communication apparatus.

BACKGROUND

As computing technologies change and develop towards lightweight, dynamization, and decomposition of an application into services or functions, a network architecture that enables an edge application will transform from a client-server mode to a serverless mode. In the serverless mode, the edge application is no longer a monolithic application deployed at a server end, but may be decomposed into a plurality of microservices or stateless functions and dispersedly deployed on edge servers of different edge computing nodes. In addition, multiple copies of the microservices and the stateless functions can be deployed on edge servers of a plurality of edge computing nodes, so that a same service can be accessed nearby in different regions, thereby achieving consistency experience.

In a distributed edge computing scenario, to adapt to service requirements, how to implement interconnection and cooperation between an edge computing node and a terminal device and improve resource utilization is a problem that needs to be resolved when a 3rd Generation Partnership Project (3GPP) network enables the edge application.

SUMMARY

A computing aware-session management method and a communication apparatus in one or more embodiments of this application are for forwarding a service request of a terminal device to an appropriate edge computing node based on computing service information of edge computing nodes, thus accessing a computing service deployed on the edge computing node, and improving resource utilization of a system.

According to a first aspect, an embodiment of this application provides a computing aware-session management method. The method may be performed by a second computing aware-user plane function, or may be performed by a component (for example, a chip or a circuit) configured in the second computing aware-user plane function.

In some embodiments, the method includes: The second computing aware-user plane function sends computing service information to a first computing aware-user plane function, where the computing service information indicates that an edge computing node associated with the second computing aware-user plane function supports a first computing service. The second computing aware-user plane function receives a service request packet from the first computing aware-user plane function, where the service request packet is for requesting the first computing service. The second computing aware-user plane function sends the service request packet to the edge computing node.

In some embodiments, the second computing aware-user plane function may send the computing service information to the first computing aware-user plane function, to indicate that the edge computing node associated with the second computing aware-user plane function supports the first computing service, so that the first computing aware-user plane function can forward, to the second computing aware-user plane function based on the computing service information received from the second computing aware-user plane function, the service request packet for requesting the first computing service by a terminal device. In this way, optimal selection of and access to a computing service deployed on the edge computing node are implemented based on a network-assisted manner.

In some embodiments of the first aspect, the second computing aware-user plane function receives an advertisement neighbor list from a session management function, where the advertisement neighbor list includes K ingress computing aware-user plane functions corresponding to the second computing aware-user plane function, K is a positive integer, and the K ingress computing aware-user plane functions include the first computing aware-user plane function.

In some embodiments of the first aspect, that the second computing aware-user plane function sends computing service information to a first computing aware-user plane function may include: The second computing aware-user plane function sends the computing service information to the first computing aware-user plane function based on the advertisement neighbor list.

In some embodiments of the first aspect, the second computing aware-user plane function and the first computing aware-user plane function are located in a computing aware-virtual network.

In some embodiments of the first aspect, the method further includes: The second computing aware-user plane function receives, from the edge computing node, a service identifier of the first computing service and a first server IP address corresponding to the service identifier of the first computing service, where the first server IP address is an IP address of a server running the first computing service on the edge computing node. That the second computing aware-user plane function sends the service request packet to the edge computing node may include: The second computing aware-user plane function replaces the service identifier of the first computing service with the first server IP address, wherein the service identifier of the first computing service is carried in the service request packet. The second computing aware-user plane function sends, to the edge computing node, the service request packet that carries the first server IP address.

In some embodiments of the first aspect, the method further includes: The second computing aware-user plane function receives, from the edge computing node, a service response packet that carries the first server IP address. The second computing aware-user plane function replaces the first server IP address in the service response packet with the service identifier of the first computing service. The second computing aware-user plane function sends, to the first computing aware-user plane function, the service response packet that carries the service identifier of the first computing service.

In some embodiments, the second computing aware-user plane function may receive the service identifier of the first computing service and the corresponding first server IP address from the edge computing node associated with the second computing aware-user plane function, and record a mapping relationship between the service identifier and the first server IP address, to perform mutual conversion when sending a packet to and receiving a packet from the edge computing node. In this way, a client of the terminal device only needs to care about a computing service to which a request is sent, and does not need to be aware of deployment details of the computing service (for example, the computing service is specifically running on a server of which edge computing node, and an IP address of the server), to effectively improve access efficiency and user experience of an edge computing service.

In some embodiments of the first aspect, the method further includes: The second computing aware-user plane function receives the computing service information from the edge computing node.

In some embodiments of the first aspect, the computing service information includes the service identifier of the first computing service, a service attribute of the first computing service, and a running status of the first computing service and computing resource information of the first computing service.

In some embodiments of the first aspect, the method further includes: The second computing aware-user plane function receives load information from the edge computing node. The second computing aware-user plane function sends the load information to the first computing aware-user plane function.

In some embodiments, the second computing aware-user plane function may further send, to the first computing aware-user plane function, the load information of the edge computing node associated with the second computing aware-user plane function. The first computing aware-user plane function decides, based on the load information, whether to forward the service request packet of the terminal device to the second computing aware-user plane function, thus achieving system load balancing and improving resource utilization.

According to a second aspect, an embodiment of this application provides a computing aware-session management method. The method may be performed by a first computing aware-user plane function, or may be performed by a component (for example, a chip or a circuit) configured in the first computing aware-user plane function.

In some embodiments, the method includes: The first computing aware-user plane function receives computing service information from a second computing aware-user plane function, where the computing service information indicates that an edge computing node associated with the second computing aware-user plane function supports a first computing service. The first computing aware-user plane function sends a service request packet to the second computing aware-user plane function based on the computing service information, where the service request packet is for requesting the first computing service.

In some embodiments of the second aspect, the method further includes: The first computing aware-user plane function receives a forwarding neighbor list from a session management function, where the forwarding neighbor list includes L egress computing aware-user plane functions corresponding to the first computing aware-user plane function, L is a positive integer, and the L egress computing aware-user plane functions include the second computing aware-user plane function.

In some embodiments of the second aspect, the first computing aware-user plane function and the second computing aware-user plane function are located in a computing aware-virtual network.

In some embodiments of the second aspect, the method further includes: The first computing aware-user plane function receives the service request packet from a terminal device.

In some embodiments of the second aspect, the method further includes: The first computing aware-user plane function receives load information from the second computing aware-user plane function.

In some embodiments of the second aspect, the method further includes: The first computing aware-user plane function determines, based on the computing service information and the load information, to send the service request packet to the second computing aware-user plane function.

In some embodiments of the second aspect, the method further includes: The first computing aware-user plane function sends the service request packet to the second computing aware-user plane function according to a packet matching and forwarding rule corresponding to the second computing aware-user plane function.

In some embodiments of the second aspect, the computing service information includes a service identifier of the first computing service, a service attribute of the first computing service, and a running status of the first computing service and computing resource information of the first computing service.

For beneficial effects of the second aspect and the possible designs of the second aspect, refer to corresponding descriptions in the first aspect. Details are not described again.

According to a third aspect, an embodiment of this application provides a computing aware-session management method. The method may be performed by a computing management function, or may be performed by a component (for example, a chip or a circuit) configured in the computing management function.

In some embodiments, the method includes: The computing management function receives a first request message, where the first request message is for creating a computing aware-virtual network, the computing aware-virtual network includes N computing aware-user plane functions, the first request message includes a member list of the computing aware-virtual network, and the member list includes identification information of the N computing aware-user plane functions. The computing management function generates a forwarding neighbor list for a first computing aware-user plane function, where the first computing aware-user plane function is one of the N computing aware-user plane functions, the forwarding neighbor list includes identification information of L egress computing aware-user plane functions corresponding to the first computing aware-user plane function, and N and L are positive integers. The computing management function sends a second request message to a session management function, where the second request message is for requesting to create a forwarding path in the computing aware-virtual network, and the second request message includes the member list of the computing aware-virtual network and the forwarding neighbor list of the first computing aware-user plane function.

In some embodiments, the computing management function may establish the computing aware-virtual network by using the session management function, configure a group of computing aware-user plane functions as members of the computing aware-virtual network, configure neighbor relationships for each computing aware-user plane function in the computing aware-virtual network, and establish a forwarding path between the computing aware-user plane functions in the computing aware-virtual network, for example, a forwarding tunnel between an ingress computing aware-user plane function and an egress computing aware-user plane function. In this way, the computing aware-user plane function can perform information advertisement and user plane packet forwarding based on the neighbor relationships configured for the computing aware-user plane function, so that interconnection and cooperation between edge computing nodes are achieved, and resource utilization of a system is improved.

In some embodiments of the third aspect, the first request message includes identification information of the computing aware-virtual network, and the identification information includes one or more of an identity of the computing aware-virtual network, a data network name of the computing aware-virtual network, network slice information of the computing aware-virtual network, or an application descriptor of the computing aware-virtual network.

In some embodiments of the third aspect, the method further includes: The computing management function generates an advertisement neighbor list for a second computing aware-user plane function, where the second computing aware-user plane function is one of the N computing aware-user plane functions, the advertisement neighbor list includes identification information of K ingress computing aware-user plane functions corresponding to the second computing aware-user plane function, and K is a positive integer, where the second request message further includes the advertisement neighbor list of the second computing aware-user plane function.

In some embodiments, the neighbor relationships of the computing aware-user plane function may include forwarding neighbor relationships and advertisement neighbor relationships. A computing management function may generate a forwarding neighbor list for the computing aware-user plane function, to configure forwarding neighbor relationships for the computing aware-user plane function, or may generate an advertisement neighbor list for the computing aware-user plane function, to configure advertisement neighbor relationships for the computing aware-user plane function. In this way, the ingress computing aware-user plane function in the computing aware-virtual network can perform user plane packet forwarding based on a corresponding forwarding neighbor list, and the egress computing aware-user plane function can perform information advertisement based on a corresponding advertisement neighbor list.

In some embodiments of the third aspect, the method further includes: The computing management function receives a fifth request message, where the fifth request message is for requesting to update the computing aware-virtual network, the fifth request message includes a to-be-added-member list of the computing aware-virtual network, and the to-be-added-member list includes identification information of one or more computing aware-user plane functions that need to be added to the computing aware-virtual network. The computing management function determines, based on the to-be-added-member list, a to-be-affected-member list and M computing aware-user plane functions included in an updated computing aware-virtual network, where the to-be-affected-member list includes identification information of one or more computing aware-user plane functions, a forwarding neighbor list or an advertisement neighbor list of each of the one or more computing aware-user plane functions needs to be updated, and M is a positive integer. The computing management function updates a forwarding neighbor list or an advertisement neighbor list for a third computing aware-user plane function in the to-be-affected-member list. The computing management function sends a sixth request message to the session management function, where the sixth request message is for requesting to update the forwarding path in the computing aware-virtual network, and the sixth request message includes the to-be-affected-member list and an updated forwarding neighbor list or advertisement neighbor list of the third computing aware-user plane function.

In some embodiments of the third aspect, the method further includes: The computing management function receives a fifth request message, where the fifth request message is for requesting to update the computing aware-virtual network, the fifth request message includes a to-be-deleted-member list of the computing aware-virtual network, and the to-be-deleted-member list includes identification information of one or more computing aware-user plane functions that need to be deleted from the computing aware-virtual network. The computing management function determines, based on the to-be-deleted-member list, a to-be-affected-member list and M computing aware-user plane functions included in an updated computing aware-virtual network, where the to-be-affected-member list includes identification information of one or more computing aware-user plane functions, a forwarding neighbor list or an advertisement neighbor list of each of the one or more computing aware-user plane functions needs to be updated, and M is a positive integer. The computing management function updates a forwarding neighbor list or an advertisement neighbor list for a third computing aware-user plane function in the to-be-affected-member list. The computing management function sends a sixth request message to the session management function, where the sixth request message is for requesting to update the forwarding path in the computing aware-virtual network, and the sixth request message includes the to-be-affected-member list and an updated forwarding neighbor list or advertisement neighbor list of the third computing aware-user plane function.

In some embodiments, the computing management function may update the computing aware-virtual network by using the session management function based on a deployment status change of an edge computing service, so that scalability of the computing aware-virtual network can be improved.

According to a fourth aspect, an embodiment of this application provides a computing aware-session management method. The method may be performed by a session management function, or may be performed by a component (for example, a chip or a circuit) configured in the session management function.

In some embodiments, the method includes: A session management function receives a second request message from a computing management function, where the second request message is for requesting to create a forwarding path in a computing aware-virtual network, the computing aware-virtual network includes N computing aware-user plane functions, the second request message includes a member list of the computing aware-virtual network and a forwarding neighbor list of a first computing aware-user plane function, the member list includes identification information of the N computing aware-user plane functions, the first computing aware-user plane function is one of the N computing aware-user plane functions, the forwarding neighbor list includes identification information of L egress computing aware-user plane functions corresponding to the first computing aware-user plane function, and N and L are positive integers. The session management function sends a third request message to the first computing aware-user plane function based on the member list, where the third request message is for requesting to create a virtual-network-level session of the first computing aware-user plane function, and the third request message includes identification information of the computing aware-virtual network and the forwarding neighbor list of the first computing aware-user plane function.

In some embodiments of the fourth aspect, the method further includes: The session management function generates, based on the forwarding neighbor list of the first computing aware-user plane function, forwarding tunnel information corresponding to the first computing aware-user plane function and a second computing aware-user plane function, where the forwarding tunnel information is for establishing a forwarding tunnel between the first computing aware-user plane function and the second computing aware-user plane function, and the L egress computing aware-user plane functions include the second computing aware-user plane function, where the third request message further includes the forwarding tunnel information.

In some embodiments of the fourth aspect, the second request message further includes an advertisement neighbor list of the second computing aware-user plane function, the second computing aware-user plane function is one of the N computing aware-user plane functions, the advertisement neighbor list includes identification information of K ingress computing aware-user plane functions corresponding to the second computing aware-user plane function, and K is a positive integer. The method further includes: The session management function sends a fourth request message to the second computing aware-user plane function, where the fourth request message is for requesting to create a virtual-network-level session of the second computing aware-user plane function, and the fourth request message includes the advertisement neighbor list of the second computing aware-user plane function.

In some embodiments of the fourth aspect, the method further includes: The session management function generates forwarding tunnel information based on the advertisement neighbor list of the second computing aware-user plane function, where the forwarding tunnel information is for establishing a forwarding tunnel between the second computing aware-user plane function and the first computing aware-user plane function, and the K ingress computing aware-user plane functions include the first computing aware-user plane function, where the fourth request message further includes the forwarding tunnel information.

In some embodiments of the fourth aspect, the method further includes: The session management function receives a sixth request message from the computing management function, where the sixth request message is for requesting to update the forwarding path in the computing aware-virtual network, and the sixth request message includes a to-be-affected-member list of the computing aware-virtual network and an updated forwarding neighbor list or advertisement neighbor list of a third computing aware-user plane function in the to-be-affected-member list. The session management function sends a seventh request message to the third computing aware-user plane function, where the seventh request message is for requesting to update a virtual-network-level session of the third computing aware-user plane function, and the seventh request message includes the updated forwarding neighbor list or advertisement neighbor list of the third computing aware-user plane function.

For beneficial effects of the fourth aspect and the possible designs of the fourth aspect, refer to corresponding descriptions in the third aspect. Details are not described again.

According to a fifth aspect, an embodiment of this application provides a computing aware-session management method. The method may be performed by a first computing aware-user plane function, or may be performed by a component (for example, a chip or a circuit) configured in the first computing aware-user plane function.

In some embodiments, the method includes: The first computing aware-user plane function receives a third request message from a session management function, where the third request message is for requesting to create a virtual-network-level session of the first computing aware-user plane function, the third request message includes identification information of a computing aware-virtual network and a forwarding neighbor list of the first computing aware-user plane function, the computing aware-virtual network includes N computing aware-user plane functions, the first computing aware-user plane function is one of the N computing aware-user plane functions, and is an ingress computing aware-user plane function in the computing aware-virtual network, the forwarding neighbor list includes identification information of L egress computing aware-user plane functions corresponding to the first computing aware-user plane function in the computing aware-virtual network, and N and L are positive integers. The first computing aware-user plane function establishes forwarding tunnels between the first computing aware-user plane function and the L corresponding egress computing aware-user plane functions based on the forwarding neighbor list.

In some embodiments of the fifth aspect, the third request message further includes forwarding tunnel information corresponding to the first computing aware-user plane function and a second computing aware-user plane function, and the L egress computing aware-user plane functions include the second computing aware-user plane function.

That the first computing aware-user plane function establishes forwarding tunnels between the first computing aware-user plane function and the L egress computing aware-user plane functions based on the forwarding neighbor list includes:

The first computing aware-user plane function establishes a forwarding tunnel between the first computing aware-user plane function and the second computing aware-user plane function based on the forwarding tunnel information.

For beneficial effects of the fifth aspect and the possible designs of the fifth aspect, refer to corresponding descriptions in the third aspect. Details are not described again.

According to a sixth aspect, an embodiment of this application provides a computing aware-session management method. The method may be performed by a second computing aware-user plane function, or may be performed by a component (for example, a chip or a circuit) configured in the second computing aware-user plane function.

In some embodiments, the method includes: The second computing aware-user plane function receives a fourth request message from a session management function, where the fourth request message is for requesting to create a virtual-network-level session of the second computing aware-user plane function, the fourth request message includes identification information of a computing aware-virtual network and an advertisement neighbor list of the second computing aware-user plane function, the computing aware-virtual network includes N computing aware-user plane functions, the second computing aware-user plane function is one of the N computing aware-user plane functions, the advertisement neighbor list includes identification information of K ingress computing aware-user plane functions corresponding to the second computing aware-user plane function, and N and K are positive integers. The second computing aware-user plane function establishes advertisement forwarding relationships between the second computing aware-user plane function and the K corresponding ingress computing aware-user plane functions based on the advertisement neighbor list.

In some embodiments of the sixth aspect, the fourth request message further includes forwarding tunnel information corresponding to the second computing aware-user plane function and a first computing aware-user plane function, and the K ingress computing aware-user plane functions include the first computing aware-user plane function; and the method further includes: The second computing aware-user plane function establishes a forwarding tunnel between the second computing aware-user plane function and the first computing aware-user plane function based on the forwarding tunnel information.

For beneficial effects of the sixth aspect and the possible designs of the sixth aspect, refer to corresponding descriptions in the third aspect. Details are not described again.

According to a seventh aspect, an embodiment of this application provides a communication apparatus. The apparatus has a function of implementing the second computing aware-user plane function in the first aspect or any one of the possible designs of the first aspect, may have a function of implementing the first computing aware-user plane function in the second aspect or any one of the possible designs of the second aspect, may have a function of implementing the computing management function in the third aspect or any one of the possible designs of the third aspect, may have a function of implementing the session management function in the fourth aspect or any one of the possible designs of the fourth aspect, may have a function of implementing the first computing aware-user plane function in the fifth aspect or any one of the possible designs of the fifth aspect, or may have a function of implementing the second computing aware-user plane function in the sixth aspect or any one of the possible designs of the sixth aspect. The apparatus may be a network device, or may be a chip included in the network device.

A function of the foregoing communication apparatus may be implemented by using hardware, or may be implemented by hardware executing corresponding software. The hardware or the software includes one or more modules, units, or means corresponding to the foregoing function.

In some embodiments, a structure of the apparatus includes a processing module and a transceiver module. The processing module is configured to support the apparatus in performing a function corresponding to the second computing aware-user plane function in the first aspect or any one of the designs of the first aspect, performing a function corresponding to the first computing aware-user plane function in the second aspect or any one of the designs of the second aspect, performing a function corresponding to the computing management function in the third aspect or any one of the designs of the third aspect, performing a function corresponding to the session management function in the fourth aspect or any one of the designs of the fourth aspect, performing a function corresponding to the first computing aware-user plane function in the fifth aspect or any one of the designs of the fifth aspect, or performing a function corresponding to the second computing aware-user plane function in the sixth aspect or any one of the designs of the sixth aspect. The transceiver module is configured to support communication between the apparatus and another communication device. For example, when the apparatus is a second computing aware-user plane function, the transceiver module may receive computing service information from an edge computing node, and send the computing service information to a first computing aware-user plane function. The communication apparatus may further include a storage module. The storage module is coupled to the processing module. The storage module stores program instructions and data that are necessary for the apparatus. In an example, the processing module may be a processor, the transceiver module may be a transceiver, and the storage module may be a memory. The memory may be integrated with the processor, or may be disposed separately from the processor.

In some embodiments, a structure of the apparatus includes a processor, and may further include a memory. The processor is coupled to the memory, and may be configured to execute computer program instructions stored in the memory, so that the apparatus performs the method according to any one of the first aspect or the possible designs of the first aspect, performs the method according to any one of the second aspect or the possible designs of the second aspect, performs the method according to any one of the third aspect or the possible designs of the third aspect, performs the method according to any one of the fourth aspect or the possible designs of the fourth aspect, performs the method according to any one of the fifth aspect or the possible designs of the fifth aspect, or performs the method according to any one of the sixth aspect or the possible designs of the sixth aspect. Optionally, the apparatus further includes a communication interface. The processor is coupled to the communication interface. When the apparatus is the network device, the communication interface may be a transceiver or an input/output interface. When the apparatus is the chip included in the network device, the communication interface may be an input/output interface of the chip. Optionally, the transceiver may be a transceiver circuit, and the input/output interface may be an input/output circuit.

According to an eighth aspect, an embodiment of this application provides a chip system, including a processor. The processor is coupled to a memory. The memory is configured to store a program or instructions. When the program or the instructions are executed by the processor, the chip system is enabled to implement the method according to any one of the first aspect or the possible designs of the first aspect, implement the method according to any one of the second aspect or the possible designs of the second aspect, implement the method according to any one of the third aspect or the possible designs of the third aspect, implement the method according to any one of the fourth aspect or the possible designs of the fourth aspect, implement the method according to any one of the fifth aspect or the possible designs of the fifth aspect, or implement the method according to any one of the sixth aspect or the possible designs of the sixth aspect.

In some embodiments, the chip system further includes an interface circuit. The interface circuit is configured to exchange code instructions to the processor.

In some embodiments, there may be one or more processors in the chip system, and the processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

In some embodiments, there may also be one or more memories in the chip system. The memory may be integrated with the processor, or may be disposed separately from the processor. For example, the memory may be a non-transitory processor, for example, a read-only memory ROM. The memory and the processor may be integrated on a same chip, or may be separately disposed on different chips.

According to a ninth aspect, an embodiment of this application provides a computer-readable storage medium. The computer-readable storage medium stores a computer program or instructions. When the computer program or the instructions are executed, a computer is enabled to perform the method according to any one of the first aspect or the possible designs of the first aspect, perform the method according to any one of the second aspect or the possible designs of the second aspect, perform the method according to any one of the third aspect or the possible designs of the third aspect, perform the method according to any one of the fourth aspect or the possible designs of the fourth aspect, perform the method according to any one of the fifth aspect or the possible designs of the fifth aspect, or perform the method according to any one of the sixth aspect or the possible designs of the sixth aspect.

According to a tenth aspect, an embodiment of this application provides a computer program product. When a computer reads and executes the computer program product, the computer is enabled to perform the method according to any one of the first aspect or the possible designs of the first aspect, perform the method according to any one of the second aspect or the possible designs of the second aspect, perform the method according to any one of the third aspect or the possible designs of the third aspect, perform the method according to any one of the fourth aspect or the possible designs of the fourth aspect, perform the method according to any one of the fifth aspect or the possible designs of the fifth aspect, or perform the method according to any one of the sixth aspect or the possible designs of the sixth aspect.

According to an eleventh aspect, an embodiment of this application provides a communication system. The communication system includes a computing management function, a session management function, and N computing aware-user plane functions. A computing aware-virtual network includes the N computing aware-user plane functions. In some embodiments, the communication system may further include a terminal device. The terminal device may be connected to at least one of the N computing aware-user plane functions. In some embodiments, the communication system may further include at least one edge computing node. A regional computing group may include the at least one edge computing node. One or more of the N computing aware-user plane functions may be connected to the edge computing node.

DETAILED DESCRIPTION

Figure 1:
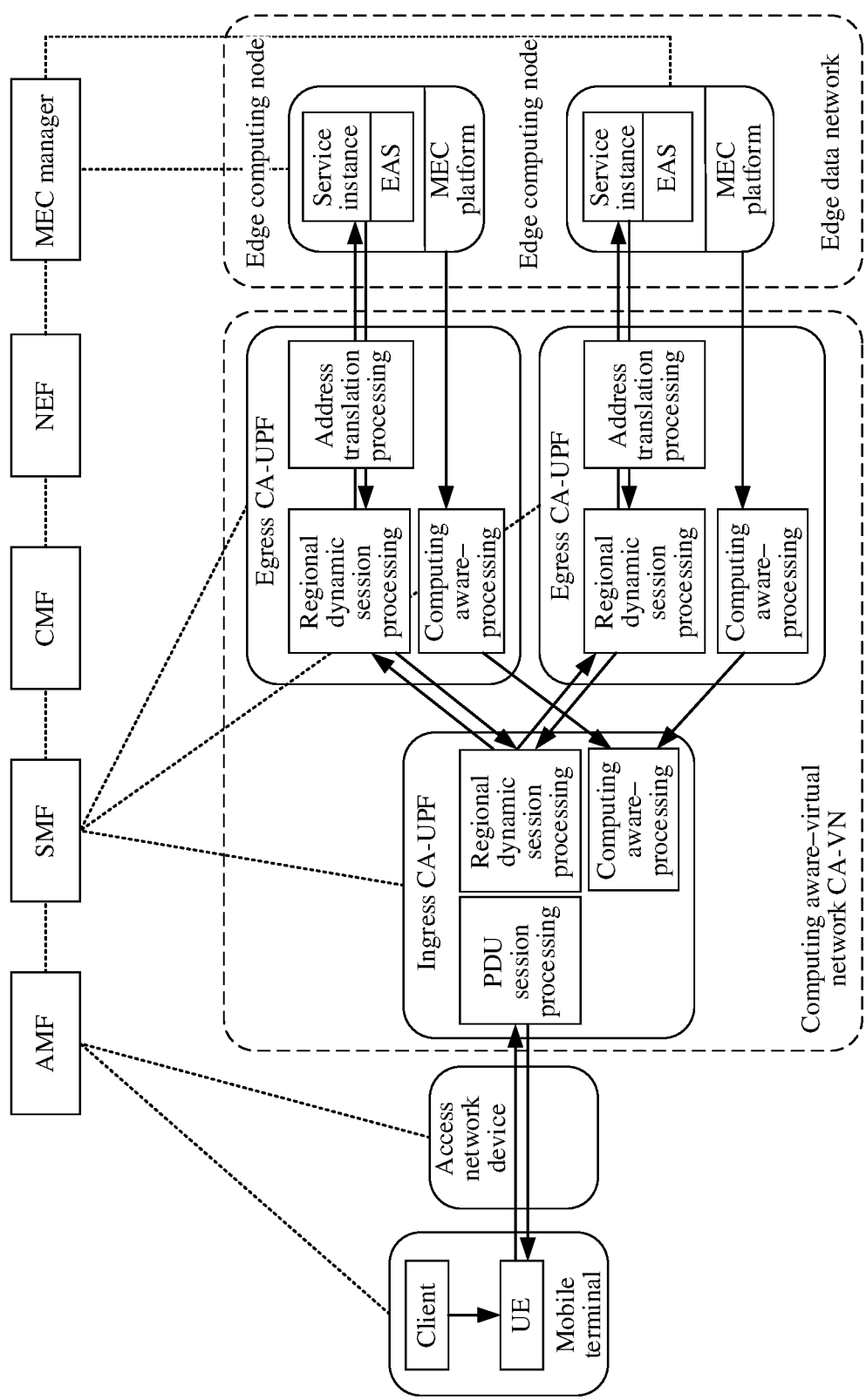
FIG. 1 is a schematic diagram of a network architecture of a communication system used in an embodiment of this application.

To make objectives, technical solutions, and advantages of embodiments of this application clearer, the following further describes embodiments of this application in detail with reference to accompanying drawings.

The technical solutions in ONE OR MORE embodiments of this application may be applied to various communication systems, for example, a long term evolution (LTE) system, an LTE frequency division duplex (FDD) system, an LTE time division duplex (TDD) system, a 5th generation (5G) mobile communication system, or a new radio (NR) system, or applied to a future communication system, another similar communication system, or the like.

In the following, some terms in this application are explained and described, to facilitate understanding of the terms for a person skilled in the art.

(1) A terminal device is a device that has a wireless transceiver function. The terminal device may communicate with a core network or the Internet through a radio access network (RAN), and exchange a voice and/or data with the RAN.

The terminal device may include user equipment (UE), a wireless terminal device, a mobile terminal device, a D2D terminal device, a vehicle to everything (V2X) terminal device, a machine-to-machine/machine type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may be a mobile phone, a tablet, a computer with a wireless transceiver function, or a portable, pocket-sized, handheld, or computer built-in mobile apparatus. For another example, the terminal device may alternatively be a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a terminal device in a future evolved public land mobile network (PLMN), a vehicle device in V2X, or customer premises equipment (CPE). For still another example, the terminal device may alternatively be a device such as a personal communication service (PCS) phone, a cordless telephone set, a session initiation protocol (SIP) phone, a wireless local loop (WLL) station, or a personal digital assistant (PDA). A specific technology and a specific device form that are used for the terminal device are not limited in embodiments of this application.

By way of example but not limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn or integrated into clothes or an accessory of a user. The wearable device is not only a hardware device, but also implements a powerful function through software support, data exchange, and cloud interaction. In a broad sense, the wearable intelligent device includes full-featured and large-sized devices that can implement all or some functions without depending on smartphones, for example, smart watches or smart glasses, and devices that focus only on a type of application function and need to work with other devices such as smartphones, for example, various smart bands, smart helmets, or smart jewelry for monitoring physical signs. If the various terminal devices described above are located in a vehicle (for example, placed in the vehicle or mounted in the vehicle), the terminal devices may be considered as vehicle-mounted terminal devices. For example, the vehicle-mounted terminal devices are also referred to as on-board units (OBUs).

(2) A radio access network device is a device that is in a communication system and that is configured to enable a terminal device to access a wireless network. The radio access network device may usually be connected to a core network through a wired link (for example, an optical fiber cable). The radio access network device may be a node in a RAN, may also be referred to as a base station, and may also be referred to as a RAN node (or device).

The radio access network device may include a base station, an evolved NodeB (eNodeB) in an LTE system or an LTE-advanced (LTE-A) system, a next generation NodeB (gNB) in a 5G communication system, a transmission reception point (TRP), a base band unit (BBU), an access point (AP) in a wireless local area network (WLAN), an integrated access and backhaul (IAB) node, a base station in a future mobile communication system, an access node in a Wi-Fi system, or the like. The radio access network device may alternatively be a module or unit that completes some functions of the base station, for example, a central unit (CU) or a distributed unit (DU). A specific technology and a specific device form that are used for the radio access network device are not limited in embodiments of this application.

For example, in a network structure, the radio access network device may be a CU node, a DU node, or a radio access network device including a CU node and a DU node. The CU node is configured to support protocols such as radio resource control (RRC), packet data convergence protocol (PDCP), and service data adaptation protocol (SDAP). The DU node is configured to support a radio link control (RLC) layer protocol, a medium access control (MAC) layer protocol, and a physical layer protocol.

In embodiments of this application, the radio access network device and the terminal may be deployed on land, and include an indoor or outdoor device, or a handheld or vehicle-mounted device; may be deployed on water; or may be deployed on an aircraft or a balloon in the air, or on a satellite. Application scenarios of the radio access network device and the terminal device are not limited in embodiments of this application. In embodiments of this application, the radio access network device may be referred to as an access network device for short. Unless otherwise specified, each access network device below refers to the radio access network device.

(3) Core network devices are devices in a core network (CN) that provide service support for a terminal device. The core network devices may include entities such as an access and mobility management function (AMF), a session management function (SMF), a user plane function (UPF), a network exposure function (NEF), a unified data management (UDM), and an application function (AF).

The AMF is mainly for access management and mobility management of the terminal devices, for example, user location update, network registration, and cell handover. The SMF is mainly for session management, for example, user session establishment, modification, and release. The UPF is a user plane functional entity, and is mainly responsible for connecting to an external network and processing of a user packet. The NEF is configured to expose some functions of a network to an application under control. The UDM is configured to manage subscription information of the terminal device. The AF is configured to provide service data of various applications for a control plane network element in a communication network of an operator, or obtain data information and control information of the network from the control plane network element in the communication network.

It should be noted that the core network devices may further include an edge-computing-related entity newly introduced in embodiments of this application, and details are described below. In some embodiments, the core network device may further include other entities, which are not involved in embodiments of this application and will not be described one by one.

It should be noted that an entity in embodiments of this application may also be referred to as a network element or a functional entity. For example, an AMF entity may also be referred to as an AMF network element or an AMF functional entity, and an SMF entity may also be referred to as an SMF network element or an SMF functional entity. The foregoing network elements or functional entities may be network elements in hardware devices, software functions running on dedicated hardware, or virtualized functions instantiated on a platform (for example, a cloud platform). In some embodiments, each of the foregoing network elements or functional entities may be implemented by one device, may be jointly implemented by a plurality of devices, or may be implemented by one functional module in one device. This is not specifically limited in embodiments of this application.

FIG. 1 is a diagram of a network architecture of a communication system used in an embodiment of this application. The communication system includes a terminal device, a radio access network device, an AMF, an SMF, a computing management function (CMF), a NEF, a multi-access edge computing (MEC) manager, at least one computing aware-user plane function (CA-UPF), and an edge data network. The edge data network may include at least one edge computing node.

It should be noted that, for brevity of description, the CMF, a CA-VN, the SMF, and the CA-UPF are used as an example in the following embodiments. The CMF may be replaced by the computing management function, the CA-VN may be replaced by a computing aware-virtual network, the SMF may be replaced by a session management function, and the CA-UPF may be replaced by the computing aware-user plane function.

A client is deployed in the terminal device, and the client may include an application client and an edge enabler client (EEC).

The CMF may create the computing aware-virtual network (CA-VN) between CA-UPFs by using the SMF, establish a neighbor relationship for neighboring CA-UPFs in the CA-VN, and perform, based on computing awareness, dynamic session management for the CA-UPFs that form the neighbor relationship. In this way, edge computing nodes associated with the neighboring CA-UPFs form a regional computing group, a computing service may be dynamically deployed in the regional computing group, and service capability information of the edge computing nodes may be quickly advertised between the CA-UPFs. Hence, a service request of a terminal device can be quickly responded, and can be forwarded to an optimal edge computing node based on dynamic service capability information and network cost information, thus achieving overall resource load balancing in a system and optimal user experience.

The CA-VN is a network that includes a plurality of CA-UPFs, capable of performing dynamic session management based on a service identifier of the computing service, adaptive to dynamic deployment of the computing service and capable of adaptively optimizing computing resources. The CA-VN exists in a form of an internal virtual interface in the CA-UPF, and may have a plurality of instances. Each CA-VN corresponds to a different network slice instance (NSI) and/or data network name (DNN). CA-UPF members included in different CA-VNs may be completely different, may partially overlap, or may be completely the same. This is not limited in this application.

The regional computing group is a computing group including a plurality of edge computing nodes that are associated with the neighboring CA-UPFs in the CA-VN. The regional computing group breaks a resource bottleneck of a single site through load balancing, thus increasing a scale of applications that can be served by edge computing. It should be noted that a region and the neighboring herein are defined based on a network delay between the edge computing nodes. The regional computing group can include only edge computing nodes within a specified delay. Otherwise, there is no meaning.

Each edge computing node may be associated with one CA-UPF in the CA-VN, and the CA-UPF is used as the last hop before a service request packet of the terminal device is forwarded to the edge computing node, to ensure that entire end-to-end data forwarding path is controlled by a mobile network. An interface between the edge computing node and the CA-UPF is an N6 interface defined by 3GPP, and an interface between the CA-UPFs is an N19 interface defined by 3GPP. It may be understood that the CA-UPFs associated with the edge computing nodes in the regional computing group are in neighbor relationships with each other.

An edge computing platform is deployed in the edge computing node. The edge computing platform may also be referred to as an MEC platform, and is responsible for local computing, storage, network resource scheduling, and the like. The edge computing platform may include one or more edge application servers (EASs) configured to deploy or run the computing service. A physical form of the EAS may be a physical bare-metal server, or may be a virtual machine, a container, or the like. This is not limited in this application. A different server IP address is allocated to each EAS.

An edge computing manager interacts with the edge computing platform to implement dynamic deployment, orchestration, and lifecycle management of resources at different granularities, for example, the virtual machine, a microservice, and a function instance, on a plurality of edge computing nodes.

It should be noted that the computing service mentioned in embodiments of this application, also referred to as an edge application or an edge service, is not a monolithic application in a client-server mode, but a lightweight service, for example, the microservice or the function instance. These lightweight computing services are deployed and run on the EAS in the edge computing node. In some embodiments, the computing service may be a stateless short-lifecycle microservice or function instance.

Each type of computing services corresponds to a unique service identifier (ID) in a management domain of an operator network. A plurality of service instances of a same computing service may run on EASs of different edge computing nodes, but still have a same service identifier. This means, a computing service name is in a one-to-one correspondence with a service identifier.

To reuse an existing IP protocol stack as much as possible, the service identifier of the computing service may be an IP anycast address. In this way, a computing service name in the service request sent by the terminal device may be translated into a service identifier, and the service identifier is used as a destination IP address of an IP packet of the service request. A user of the terminal device only needs to care about a computing service which the service request is sent to request, and does not need to care about a specific server on which a service instance of the computing service runs and a server IP address of the specific server. The CA-UPF may route and forward the service request packet based on the service identifier of the computing service, and perform mutual conversion between the service identifier and the server IP address when receiving a packet from the EAS or sending a packet to the EAS.

In the CA-VN, there are two service roles of the CA-UPF: an ingress CA-UPF and an egress CA-UPF. The ingress CA-UPF is a CA-UPF selected by the terminal device as an access anchor, and the egress CA-UPF is another CA-UPF that has a neighbor relationship with the ingress CA-UPF. The ingress CA-UPF may receive the service request sent by the terminal device. The egress CA-UPF may advertise, to the corresponding ingress CA-UPF, service capability information of an edge computing node associated with the egress CA-UPF, so that the ingress CA-UPF performs route selection on the service request received from the terminal device, and dynamically forwards, to an optimal egress CA-UPF, the service request from the terminal device based on the current service capability information and network cost information.

Any CA-UPF in the CA-VN may be selected by the terminal device as an access anchor. Therefore, the CA-UPF in the CA-VN may exist only as an ingress CA-UPF, may exist only as an egress CA-UPF, or may exist as both an ingress CA-UPF and an egress CA-UPF. In other words, a service role of the CA-UPF is relative to a neighboring CA-UPF of the CA-UPF, and may vary with a neighbor relationship of the CA-UPF.

It may be understood that, when the CA-UPF is used as an ingress CA-UPF, there may be one or more egress CA-UPFs corresponding to the CA-UPF. Similarly, when the CA-UPF is used as an egress CA-UPF, there may also be one or more ingress CA-UPFs corresponding to the CA-UPF, which indicates that the CA-UPF may be the egress CA-UPF corresponding to the one or more ingress CA-UPFs.

Based on different service roles of CA-UPFs, neighbor relationships between the CA-UPFs may also be classified into two types: a forwarding neighbor relationship and an advertisement neighbor relationship. The forwarding neighbor relationship is for an ingress CA-UPF. The forwarding neighbor relationship is a neighbor relationship between the ingress CA-UPF and all forwarding objects (namely, egress CA-UPFs) corresponding to the ingress CA-UPF, and indicates that the ingress CA-UPF may forward, to one of the plurality of egress CA-UPFs that have the forwarding neighbor relationship with the ingress CA-UPF, the service request from the terminal device. The advertisement neighbor relationship is for an egress CA-UPF, is a neighbor relationship between the egress CA-UPF and advertisement objects (namely, ingress CA-UPFs) corresponding to the egress CA-UPF, and indicates that the egress CA-UPF needs to advertise the service capability information of the edge computing node associated with the egress CA-UPF to each ingress CA-UPF that has the advertisement neighbor relationship with the egress CA-UPF.

The forwarding neighbor relationship between the CA-UPFs may be reflected by a forwarding neighbor list, and the advertisement neighbor relationship may be reflected by an advertisement neighbor list. In the CA-VN, each CA-UPF that may be used as the ingress CA-UPF may have a corresponding forwarding neighbor list. Similarly, each CA-UPF (namely, a CA-UPF that has a neighbor relationship with the CA-UPF that may be used as the ingress CA-UPF) that may be used as the egress CA-UPF may have a corresponding advertisement neighbor list.

A forwarding neighbor list of one CA-UPF in the CA-VN may include one or more egress CA-UPFs corresponding to the CA-UPF used as the ingress CA-UPF. This means, the CA-UPF may be for forwarding, to all the egress CA-UPFs, the service request from the terminal device. An advertisement neighbor list of the CA-UPF in the CA-VN may include one or more ingress CA-UPFs corresponding to the CA-UPF used as the egress CA-UPF. This means, the CA-UPF may be for advertising, to all the ingress CA-UPFs, service capability information of an edge computing node associated with the CA-UPF.

In this way, the CMF may be further configured to manage a forwarding neighbor list and/or an advertisement neighbor list of each CA-UPF, and members of the forwarding neighbor list and/or the advertisement neighbor list of the CA-UPF may be added, modified, and deleted as needed. However, it should be noted that, because the forwarding neighbor relationship is relative to the advertisement neighbor relationship, the CMF needs to ensure that an advertisement neighbor list of each egress CA-UPF in a forwarding neighbor list of one ingress CA-UPF includes the ingress CA-UPF.

In addition to an existing protocol data unit (PDU) session processing unit of a user plane function (UPF), a computing aware-processing unit, a regional dynamic session processing unit, and a network address translation unit are added to the CA-UPF.

Specifically, for the computing aware-processing unit, a computing aware-processing unit located in the egress CA-UPF is responsible for obtaining service capability information from the edge computing node, storing a mapping relationship between the service identifier (ID) of the computing service and a server IP address, and forwarding the service capability information of the edge computing node to the ingress CA-UPF in the advertisement neighbor list. The service capability information of the edge computing node may include computing service information and/or load information of the edge computing node. The computing service information indicates computing services supported by the edge computing node, and may specifically include information such as a service identifier, a service attribute, a running status, and computing resource information of each computing service. The load information is for representing a current load status of the edge computing node.

A computing aware-processing unit in the ingress CA-UPF is responsible for receiving service capability information from the egress CA-UPF, and generating or updating a computing routing information base between the ingress CA-UPF and the egress CA-UPF. The computing routing information base includes computing routing information of one or more computing services. The computing routing information of the computing service includes the service identifier of the computing service, identification information of one or more egress CA-UPFs that can provide the computing service, and service capability information (including computing service information and/or load information of an associated edge computing node) and network cost information that correspond to each of the one or more egress CA-UPFs. The computing aware-processing unit may select, based on the computing routing information of the computing service in the computing routing information base, an appropriate forwarding tunnel for a service request received by the regional dynamic session processing unit, and generate a corresponding packet matching and forwarding rule.

A main function of the regional dynamic session processing unit is establishing a forwarding tunnel between the ingress CA-UPF and the egress CA-UPF based on forwarding tunnel information delivered by the SMF, and forwarding a packet in real time based on the packet matching and forwarding rule generated by the computing aware-processing unit. After a regional dynamic session processing unit in the ingress CA-UPF receives a packet from the terminal device, if there is no corresponding packet matching and forwarding rule for matching the packet with a corresponding forwarding tunnel, the computing aware-processing unit may select an egress CA-UPF for the packet based on the computing routing information base, and generate the corresponding packet matching and forwarding rule.

A main function of the network address translation unit is completing mutual replacement between the service identifier of the computing service and the server IP address in the packet based on the mapping relationship between the service identifier of the computing service and the server IP address, and the mapping relationship is provided by the computing aware-processing unit. The network address translation unit may replace the original service identifier of the computing service with the server IP address for a destination IP address in an uplink packet sent to the EAS, and replace the original server IP address with the service identifier of the computing service for a source IP address in a downlink packet returned to the terminal device.

It should be noted that, terms "system" and "network" in embodiments of this application may be used interchangeably. "A plurality of" means two or more. In view of this, "a plurality of" may also be understood as "at least two" in embodiments of this application. "At least one" may be understood as one or more, for example, one, two, or more. For example, "including at least one" means including one, two, or more, and does not limit which items are included. For example, if at least one of A, B, and C is included, A, B, C, A and B, A and C, B and C, or A, B, and C may be included. Similarly, understanding of descriptions such as "at least one type" is similar. The term "and/or" describes an association relationship between associated objects and represents that three relationships may exist. For example, A and/or B may represent the following three cases: Only A exists, both A and B exist, and only B exists. In addition, unless otherwise specified, the character "/" generally indicates an "or" relationship between the associated objects.

Unless otherwise stated, ordinal numbers such as "first" and "second" in embodiments of this application are for distinguishing between a plurality of objects, but are not intended to limit a sequence, a time sequence, priorities, or importance of the plurality of objects. In addition, descriptions of "first" and "second" do not necessarily indicate that objects are different.

Figure 2A:
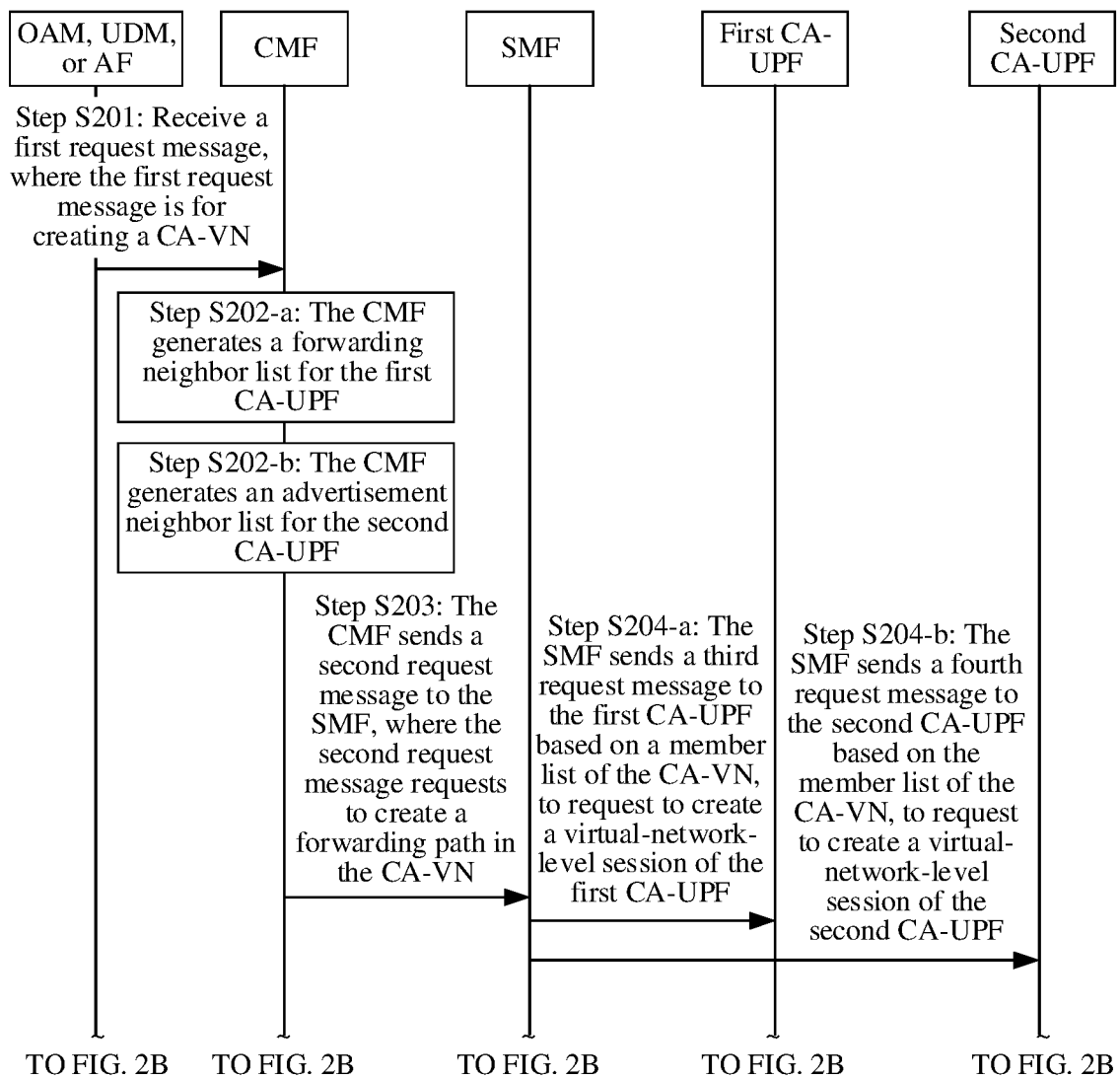
FIG. 2A and FIG. 2B are a schematic flowchart of a method for creating a computing aware-virtual network according to an embodiment of this application.
Figure 2B:
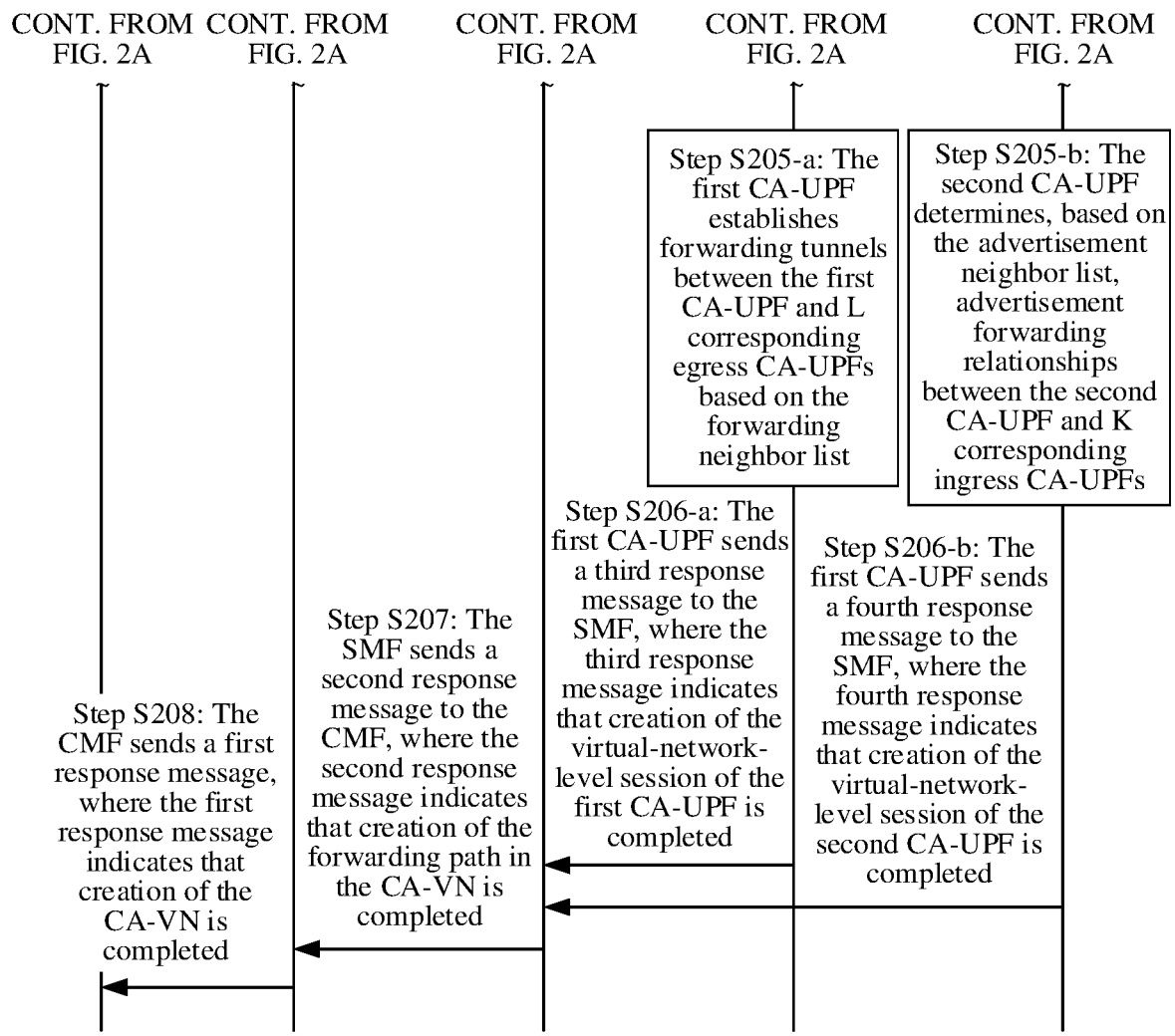

FIG. 2A and FIG. 2B show a method for creating a computing aware-virtual network according to an embodiment of this application. The method includes the following steps.

Step S201: A CMF receives a first request message, where the first request message is for creating a CA-VN, the CA-VN includes N CA-UPFs, and N is a positive integer.

In this embodiment of this application, the first request message includes a member list of the CA-VN, and the member list includes identification information of the N CA-UPFs in the CA-VN. It may be understood that the CA-UPF included in the CA-VN may be referred to as a CA-UPF member of the CA-VN, or may be referred to as a member for short.

In some embodiments, the first request message further includes identification information of the CA-VN. The identification information may include one or more of information such as an identity (ID) of the CA-VN, or a DNN of the CA-VN, network slice information of the CA-VN, or an application descriptor of the CA-VN. It may be understood that different CA-VNs may correspond to different DNNs, different network slice information, or different application descriptors.

The first request message may also be referred to as a CA-VN creation request message, or may have another name. This is not limited. Similarly, the member list may also be referred to as CA-VN member information.

In some embodiments, an operations, administration and management (OAM) or a UDM may send the first request message to the CMF, or an AF may send the first request message to the CMF via a NEF. Accordingly, the CMF may receive the first request message from the OAM, the UDM, or the AF. It may be understood that creation of the CA-VN may alternatively be triggered by the CMF, or may be triggered by another core network element. This is not limited in this application.

Step S202-a: The CMF generates a forwarding neighbor list for a first CA-UPF, where the first CA-UPF is one of the N CA-UPFs included in the CA-VN.

In this embodiment of this application, the first CA-UPF is an ingress CA-UPF in the CA-VN. It should be understood that, that the first CA-UPF is an ingress CA-UPF in the CA-VN indicates that a service role of the first CA-UPF may be the ingress CA-UPF, and the first CA-UPF performs corresponding functions, including receiving information (for example, service capability information of an edge computing node associated with a corresponding egress CA-UPF) advertised by the egress CA-UPF, constructing a computing routing information base, admitting attachment of a terminal device to the first CA-UPF, receiving a service request from the terminal device, forwarding the service request to a corresponding egress CA-UPF or deciding to process the service request on an edge computing node associated with the first CA-UPF, and the like.

The forwarding neighbor list includes identification information of L egress CA-UPFs corresponding to the first CA-UPF in the CA-VN, where L is a positive integer. It may be understood that the first CA-UPF and the L corresponding egress CA-UPFs belong to a same CA-VN, namely, the CA-VN.

Specifically, the forwarding neighbor list is for establishing forwarding tunnels between the first CA-UPF and the L corresponding egress CA-UPFs, and the forwarding tunnel is a bidirectional forwarding tunnel between the ingress CA-UPF and the egress CA-UPF. The first CA-UPF may determine, based on the forwarding neighbor list, egress CA-UPFs corresponding to the first CA-UPF. In other words, the first CA-UPF determines, based on the forwarding neighbor list, CA-UPFs to which the service request received from the terminal device may be forwarded.

Step S202-b: The CMF generates an advertisement neighbor list for a second CA-UPF, where the second CA-UPF is another CA-UPF (other than the first CA-UPF) among the N CA-UPFs included in the CA-VN.

In this embodiment of this application, the second CA-UPF is an egress CA-UPF in the CA-VN. It should be understood that, that the second CA-UPF is an egress CA-UPF in the CA-VN indicates a service role of the second CA-UPF may be the egress CA-UPF, and the second CA-UPF performs corresponding functions, including receiving service capability information from an edge computing node associated with the second CA-UPF, forwarding the service capability information of the edge computing node associated with the second CA-UPF to a corresponding ingress CA-UPF, receiving a service request from the corresponding ingress CA-UPF, forwarding the service request to the associated edge computing node, and the like.

The advertisement neighbor list includes identification information of K ingress CA-UPFs corresponding to the second CA-UPF in the CA-VN, where K is a positive integer. It may be understood that the second CA-UPF and the K corresponding ingress CA-UPFs belong to a same CA-VN, namely, the CA-VN.

Specifically, the advertisement neighbor list is for establishing advertisement forwarding relationships and forwarding tunnels between the second CA-UPF and the K corresponding ingress CA-UPFs. The forwarding tunnel is a bidirectional forwarding tunnel between the egress CA-UPF and the ingress CA-UPF. The advertisement forwarding relationship means that the egress CA-UPF needs to advertise, to the ingress CA-UPF corresponding to the egress CA-UPF, the service capability information (including computing service information and/or load information) of the edge computing node associated with the egress CA-UPF, so that the ingress CA-UPF decides whether to request to forward the service request of the terminal device to the egress CA-UPF, to request some computing services by using the egress CA-UPF. The second CA-UPF may determine, based on the advertisement neighbor list, ingress CA-UPFs corresponding to the second CA-UPF. In other words, the second CA-UPF determines, based on the advertisement neighbor list, CA-UPFs to which the service capability information of the edge computing node associated with the second CA-UPF needs to be advertised.

It should be noted that, in this embodiment of this application, for a CA-UPF in the CA-VN, an egress CA-UPF and an ingress CA-UPF that correspond to the CA-UPF may be determined by the CMF through comprehensive calculation based on factors such as locations of the CA-UPFs in the CA-VN, mutual distances between the CA-UPFs, network status information of the CA-UPFs, and computing resource information of edge computing nodes associated with the CA-UPFs, which depends on an internal implementation of the CMF. The network status information may include network topology information and link status information (for example, a delay and bandwidth). Therefore, in this embodiment of this application, a specific process in which the CMF generates the forwarding neighbor list or the advertisement neighbor list for the CA-UPFs in the CA-VN is not limited.

As described above, the CA-UPF in the CA-VN may exist only as an ingress CA-UPF, may exist only as an egress CA-UPF, or may exist as both an ingress CA-UPF and an egress CA-UPF, and a service role of the CA-UPF in the CA-VN dynamically varies with neighbor relationships between the CA-UPFs. Therefore, in this embodiment of this application, the first CA-UPF may be only an ingress CA-UPF in the CA-VN, or may be both an ingress CA-UPF and an egress CA-UPF in the CA-VN. However, that the first CA-UPF is both the ingress CA-UPF and the egress CA-UPF in the CA-VN does not mean that the first CA-UPF is both the ingress CA-UPF and the egress CA-UPF at a same moment, although this is also possible, but means that the first CA-UPF has two service roles: the ingress CA-UPF and the egress CA-UPF. In this case, when the first CA-UPF may further be the egress CA-UPF in the CA-VN, the CMF may further generate an advertisement neighbor list for the first CA-UPF. The advertisement neighbor list includes identification information of K ingress CA-UPFs corresponding to the first CA-UPF in the CA-VN, where K is a positive integer.

Similarly, the second CA-UPF may also be only an egress CA-UPF in the CA-VN, or may also be both an egress CA-UPF and an ingress CA-UPF in the CA-VN. Likewise, that the second CA-UPF is both the egress CA-UPF and the ingress CA-UPF in the CA-VN does not mean that the second CA-UPF is both the egress CA-UPF and the ingress CA-UPF at a same moment, although this is also possible, but means that the second CA-UPF has two service roles: the egress CA-UPF and the ingress CA-UPF. In this case, when the second CA-UPF may further be the ingress CA-UPF in the CA-VN, the CMF may further generate a forwarding neighbor list for the second CA-UPF. The forwarding neighbor list includes identification information of L egress CA-UPFs corresponding to the second CA-UPF in the CA-VN, where L is a positive integer.

It should be noted that, in this embodiment of this application, an example in which the first CA-UPF is the ingress CA-UPF and the second CA-UPF is the egress CA-UPF is used to respectively describe functions of (or actions or steps that can be performed by) the ingress CA-UPF and the egress CA-UPF. When the first CA-UPF may also be the egress CA-UPF in the CA-VN, a function of the first CA-UPF may refer to the relevant descriptions of the second CA-UPF in this embodiment of this application. When the second CA-UPF may also be the ingress CA-UPF in the CA-VN, a function of the second CA-UPF may refer to the relevant descriptions of the first CA-UPF in this embodiment of this application. Details are not described herein again.

It should be further noted that, for ease of description, in this embodiment of this application, L indicates that one ingress CA-UPF may correspond to one or more egress CA-UPFs, and K indicates that one egress CA-UPF may also correspond to one or more ingress CA-UPFs. However, this does not indicate that the numbers of egress CA-UPFs corresponding to the CA-UPFs in the CA-VN are the same, and does not indicate that the numbers of ingress CA-UPFs corresponding to the CA-UPFs in the CA-VN are the same. Actually, the CMF independently configures a forwarding neighbor list and/or an advertisement neighbor list for each CA-UPF in the CA-VN. Therefore, the numbers of egress CA-UPFs included in forwarding neighbor lists of the CA-UPFs in the CA-VN may be the same or different. Similarly, the numbers of ingress CA-UPFs included in advertisement neighbor lists of the CA-UPFs in the CA-VN may be the same or different. No limitation is imposed.

Step S203: The CMF sends a second request message to an SMF, where the second request message is for requesting to create a forwarding path in the CA-VN, and the second request message includes the member list of the CA-VN and the forwarding neighbor list of the first CA-UPF.

Accordingly, the SMF may receive the second request message from the CMF.

In this embodiment of this application, the second request message may further include the identification information of the CA-VN (for example, the identity of the CA-VN) and the advertisement neighbor list of the second CA-UPF. If the first CA-UPF is also the egress CA-UPF in the CA-VN, the second request message may further include the advertisement neighbor list of the first CA-UPF. If the second CA-UPF is also the ingress CA-UPF in the CA-VN, the second request message may further include the forwarding neighbor list of the second CA-UPF.

The second request message may also be referred to as a CA-VN session creation request message, or may have another name. This is not limited.

Step S204-a: The SMF sends a third request message to the first CA-UPF based on the member list of the CA-VN, where the third request message is for requesting to create a virtual-network-level session of the first CA-UPF, and the third request message includes the identification information of the CA-VN and the forwarding neighbor list of the first CA-UPF.

Accordingly, the first CA-UPF may receive the third request message from the SMF.

The virtual-network-level session is a shared session for communication between CA-UPFs, and is for forwarding session packets of all terminal devices accessing the CA-VN. The virtual-network-level session is different from an existing terminal-device-level session, and the existing terminal-device-level session can only be for forwarding a packet of a terminal device.

In this embodiment of this application, before the SMF sends the third request message to the first CA-UPF, in a possible implementation, the SMF may further generate, based on the forwarding neighbor list of the first CA-UPF, forwarding tunnel information corresponding to the first CA-UPF and the egress CA-UPFs, which is used to establish the forwarding tunnels between the ingress CA-UPF and the egress CA-UPFs, and to implement forwarding paths for bidirectional communication between the ingress CA-UPF and the egress CA-UPFs. Further, the SMF may send, to the first CA-UPF by using the third request message, the forwarding tunnel information corresponding to the first CA-UPF and the egress CA-UPFs.

This implementation may be understood as that the SMF uniformly allocates and delivers the forwarding tunnel information. The forwarding tunnel information may include a device IP address of a CA-UPF at a peer end of the forwarding tunnel and identification information of the forwarding tunnel. The forwarding tunnel is specifically an uplink forwarding tunnel, namely, the forwarding tunnel from the ingress CA-UPF to the egress CA-UPF. The forwarding tunnel information is specifically uplink forwarding tunnel information.

It may be understood that uplink forwarding tunnels may be separately established between the first CA-UPF and different corresponding egress CA-UPFs. Therefore, uplink forwarding tunnel information corresponding to the first CA-UPF and the different egress CA-UPFs is also different. For example, it is assumed that the second CA-UPF is an egress CA-UPF corresponding to the first CA-UPF, and an uplink forwarding tunnel between the first CA-UPF and the second CA-UPF is denoted as an uplink forwarding tunnel 1. A third CA-UPF is another egress CA-UPF corresponding to the first CA-UPF, and an uplink forwarding tunnel between the first CA-UPF and the third CA-UPF is denoted as an uplink forwarding tunnel 2. Uplink forwarding tunnel information corresponding to the first CA-UPF and the second CA-UPF may include identification information of the uplink forwarding tunnel 1 and a device IP address of the second CA-UPF which is at a peer end of the uplink forwarding tunnel 1. While uplink forwarding tunnel information corresponding to the first CA-UPF and the third CA-UPF may include identification information of the uplink forwarding tunnel 2 and a device IP address of the third CA-UPF which is at a peer end of the uplink forwarding tunnel 2.

In this way, that the SMF sends forwarding tunnel information to the first CA-UPF may be as follows: The SMF sends L pieces of uplink forwarding tunnel information to the first CA-UPF, where the L pieces of uplink forwarding tunnel information are in a one-to-one correspondence with the L egress CA-UPFs corresponding to the first CA-UPF. In other words, the third request message may include the uplink forwarding tunnel information corresponding to the first CA-UPF and the L egress CA-UPFs.

In some embodiments, to implement bidirectional communication, the SMF may further send, to each of the egress CA-UPFs corresponding to the first CA-UPF, information about forwarding tunnels between the egress CA-UPFs and the first CA-UPF, for establishing the forwarding tunnels between the egress CA-UPFs and the corresponding ingress CA-UPF. In addition, the SMF may send the forwarding tunnel information to the egress CA-UPFs by using request messages for requesting to create virtual-network-level sessions of the egress CA-UPFs. The forwarding tunnel is specifically a downlink forwarding tunnel, and the forwarding tunnel information is specifically downlink forwarding tunnel information.

It may be understood that downlink forwarding tunnels may be separately established between the egress CA-UPFs corresponding to the first CA-UPF and the first CA-UPF. Therefore, downlink forwarding tunnel information corresponding to different egress CA-UPFs corresponding to the first CA-UPF and the first CA-UPF is also different. Downlink forwarding tunnel information corresponding to each egress CA-UPF and the first CA-UPF may include a device IP address of the first CA-UPF and identification information of a downlink forwarding tunnel between the egress CA-UPF and the first CA-UPF.

In another possible implementation, uplink forwarding tunnel information corresponding to the first CA-UPF and the egress CA-UPF may alternatively be allocated by the egress CA-UPF, then fed back to the SMF, and finally sent by the SMF to the first CA-UPF. In some embodiments, that the egress CA-UPF allocates the corresponding uplink forwarding tunnel information to the first CA-UPF may be that the egress CA-UPF allocates corresponding identification information, namely, an uplink forwarding tunnel identifier, to an uplink forwarding tunnel between the first CA-UPF and the egress CA-UPF.

Similarly, downlink forwarding tunnel information corresponding to the egress CA-UPF and the first CA-UPF may alternatively be allocated by the first CA-UPF, then fed back to the SMF, and finally sent by the SMF to the egress CA-UPF. In some embodiments, that the first CA-UPF allocates corresponding downlink forwarding tunnel information to the egress CA-UPF may be that the first CA-UPF allocates corresponding identification information, namely, a downlink forwarding tunnel identifier, to the downlink forwarding tunnel between the egress CA-UPF and the first CA-UPF.

In view of this, the third request message may not include uplink tunnel information corresponding to the first CA-UPF and the egress CA-UPFs. In other words, identification information of uplink forwarding tunnels in uplink tunnel information that corresponds to the first CA-UPF and the egress CA-UPFs and that is included in the third request message may be null. In this way, the SMF may send an (uplink) tunnel information update message to the first CA-UPF after receiving, from each of the corresponding egress CA-UPFs, a tunnel identifier allocated by each egress CA-UPF to an uplink forwarding tunnel between the first CA-UPF and the egress CA-UPF. In some embodiments, indication information indicating the SMF to request the egress CA-UPF to allocate the tunnel identifier to the uplink forwarding tunnel between the first CA-UPF and the egress CA-UPF may be carried in an establishment request message of a virtual-network-level session of the egress CA-UPF.

Similarly, the third request message may include indication information for requesting the first CA-UPF to allocate the corresponding identification information to the downlink forwarding tunnels between the egress CA-UPFs and the first CA-UPF. The first CA-UPF may allocate the corresponding identification information to the downlink forwarding tunnels between the egress CA-UPFs and the first CA-UPF, and then feed back the identification information to the SMF. Further, the SMF may send a (downlink) tunnel information update message to each of the egress CA-UPFs after receiving the identification information allocated by the first CA-UPF to the downlink forwarding tunnel between each of the egress CA-UPFs and the first CA-UPF.

If the first CA-UPF is also an egress CA-UPF in the CA-VN, the third request message may further include the advertisement neighbor list of the first CA-UPF. The third request message may also be referred to as an establishment request message of a virtual-network-level session, or may have another name. This is not limited in this application.

Step S205-*a*: The first CA-UPF establishes the forwarding tunnels between the first CA-UPF and the L corresponding egress CA-UPFs based on the forwarding neighbor list, where the forwarding tunnel is specifically an uplink forwarding tunnel.

In this embodiment of this application, the first CA-UPF may establish an uplink forwarding tunnel between the first CA-UPF and each egress CA-UPF in the forwarding neighbor list based on the forwarding neighbor list.

Specifically, it is assumed that the second CA-UPF is an egress CA-UPF corresponding to the first CA-UPF, identification information of the second CA-UPF is in the forwarding neighbor list of the first CA-UPF, and the third request message includes forwarding tunnel information corresponding to the second CA-UPF (namely, information about the forwarding tunnel between the first CA-UPF and the second CA-UPF). The forwarding tunnel information corresponding to the second CA-UPF may include the device IP address of the second CA-UPF and identification information of the forwarding tunnel between the first CA-UPF and the second CA-UPF. In this way, after receiving the third request message or the uplink tunnel information update message from the SMF, the first CA-UPF may establish the uplink forwarding tunnel between the first CA-UPF and the second CA-UPF based on the forwarding tunnel information corresponding to the second CA-UPF.

In a possible implementation, a regional dynamic session processing unit in the first CA-UPF may create an internal interface for the CA-VN based on the identification information of the CA-VN in the third request message, and then establish forwarding relationships (or connection relationships) between the internal interface corresponding to the CA-VN and external interfaces of the first CA-UPF (for example, N19 interfaces between the first CA-UPF and the corresponding egress CA-UPFs and N6 interfaces between the first CA-UPF and associated edge computing nodes) based on the forwarding neighbor list of the first CA-UPF and the information about the forwarding tunnels between the first CA-UPF and the corresponding egress CA-UPFs. Based on this, a computing aware-processing unit in the first CA-UPF may dynamically add, modify, or delete a packet matching and forwarding rule based on computing routing information, to implement bidirectional data flow forwarding between the ingress CA-UPF and the egress CA-UPF.

The internal interface corresponding to the CA-VN is an internal virtual interface (which is also referred to as an internal logical interface) created by the first CA-UPF for the CA-VN. In this embodiment of this application, if one CA-UPF belongs to a plurality of CA-VNs, different CA-VNs may correspond to different internal interfaces in the CA-UPF, to distinguish between information or messages in the different CA-VNs inside the CA-UPF.

The external interfaces of the first CA-UPF may include the interface between the first CA-UPF and the corresponding egress CA-UPF and the interface between the first CA-UPF and the associated edge computing node. For example, the interface between the first CA-UPF and the corresponding egress CA-UPF may be the N19 interface defined by 3GPP, and the interface between the first CA-UPF and the associated edge computing node may be the N6 interface defined by 3GPP.

In some embodiments, if the first CA-UPF is also an egress CA-UPF in the CA-VN, the first CA-UPF may further determine advertisement forwarding relationships between the first CA-UPF and the K corresponding ingress CA-UPFs based on the advertisement neighbor list in the third request message, and establish downlink forwarding tunnels between the first CA-UPF and the corresponding K ingress CA-UPFs.

Step S206-*a*: The first CA-UPF sends a third response message to the SMF, where the third response message indicates that creation of the virtual-network-level session of the first CA-UPF is completed.

Accordingly, the SMF may receive the third response message from the first CA-UPF.

The third response message may also be referred to as an establishment response message of the virtual-network-level session or an establishment complete message of the virtual-network-level session, or may have another name. This is not limited in this application.

Step S204-*b*: The SMF sends a fourth request message to the second CA-UPF, where the fourth request message is for requesting to create a virtual-network-level session of the second CA-UPF.

Accordingly, the second CA-UPF may receive the fourth request message from the SMF. In this embodiment of this application, after receiving the second request message from the CMF, the SMF may not only send the third request message to the first CA-UPF to request to create the virtual-network-level session of the first CA-UPF, but also send the fourth request message to the second CA-UPF to request to create the virtual-network-level session of the second CA-UPF.

The fourth request message may include the identification information of the CA-VN and the advertisement neighbor list of the second CA-UPF.

Step S205-*b*: The second CA-UPF determines, based on the advertisement neighbor list, the advertisement forwarding relationships between the second CA-UPF and the K ingress CA-UPFs corresponding to the second CA-UPF.

In a possible implementation, the SMF may uniformly allocate and deliver forwarding tunnel information. This means, the fourth request message may further include forwarding tunnel information corresponding to the second CA-UPF and the ingress CA-UPFs. In this way, after receiving the fourth request message from the SMF, the second CA-UPF may establish downlink forwarding tunnels between the egress CA-UPF and the corresponding ingress CA-UPFs based on the forwarding tunnel information corresponding to the ingress CA-UPFs, to implement forwarding paths for bidirectional communication between the ingress CA-UPFs and the egress CA-UPF.

In another possible implementation, downlink forwarding tunnel information corresponding to the second CA-UPF and the ingress CA-UPF may alternatively be allocated by the ingress CA-UPF, then fed back to the SMF, and finally sent by the SMF to the second CA-UPF. This means, the fourth request message may not include downlink tunnel information corresponding to the second CA-UPF and the ingress CA-UPFs. In other words, identification information of downlink forwarding tunnels in downlink tunnel information that corresponds to the second CA-UPF and the ingress CA-UPFs and that is included in the fourth request message may be null. In this way, the SMF may send a (downlink) tunnel information update message to the second CA-UPF after receiving, from each of the ingress CA-UPFs, a tunnel identifier allocated by each ingress CA-UPF to a downlink forwarding tunnel between the second CA-UPF and the ingress CA-UPF. In some embodiments, indication information indicating the SMF to request the ingress CA-UPF to allocate the tunnel identifier to the downlink forwarding tunnel between the second CA-UPF and the ingress CA-UPF may be carried in an establishment request message of a virtual-network-level session of the ingress CA-UPF. For example, assuming that the first CA-UPF is an ingress CA-UPF corresponding to the second CA-UPF, the third request message includes indication information for requesting the first CA-UPF to allocate corresponding identification information to a downlink forwarding tunnel between the second CA-UPF and the first CA-UPF.

Similarly, the fourth request message may include indication information for requesting the second CA-UPF to allocate corresponding identification information to uplink forwarding tunnels between the ingress CA-UPFs and the second CA-UPF. Then, the second CA-UPF may allocate the corresponding identification information to the uplink forwarding tunnels between the ingress CA-UPFs and the second CA-UPF, and then feed back the identification information to the SMF. Further, the SMF may send an (uplink) tunnel information update message to each ingress CA-UPF after receiving the identification information allocated by the second CA-UPF to the uplink forwarding tunnels between the ingress CA-UPF and the second CA-UPF.

In a possible implementation, a regional dynamic session processing unit in the second CA-UPF may create an internal interface for the CA-VN based on the identification information of the CA-VN in the fourth request message, and establish forwarding relationships (or connection relationships) between the internal interface corresponding to the CA-VN and external interfaces of the second CA-UPF based on the advertisement neighbor list of the second CA-UPF and information about forwarding tunnels between the second CA-UPF and the corresponding ingress CA-UPFs.

Step S206-b: The second CA-UPF sends a fourth response message to the SMF, where the fourth response message indicates that creation of the virtual-network-level session of the second CA-UPF is completed. Step S207: The SMF sends a second response message to the CMF, where the second response message indicates that creation of the forwarding path in the CA-VN is completed.

Accordingly, the CMF may receive the second response message from the SMF.

In this embodiment of this application, after receiving the third response message from the first CA-UPF and the fourth response message from the second CA-UPF, the SMF may send the second response message to the CMF, to indicate that creation of the forwarding path in the CA-VN is completed.

The second response message may also be referred to as a CA-VN session establishment response message or a CA-VN session establishment complete message, or may have another name. This is not limited.

Step S208: The CMF sends a first response message, where the first response message indicates that creation of the CA-VN is completed.

In some embodiments, after receiving the second response message from the SMF, the CMF may send the first response message to the OAM, the UDM, or the AF (via the NEF).

The first response message may also be referred to as a CA-VN creation response message or a CA-VN creation complete message, or may have another name. This is not limited.

It should be noted that, in this embodiment of this application, a process of creating the CA-VN involves each CA-UPF included in the CA-VN. Therefore, after the CMF determines to create the CA-VN (or after the CMF receives a request message for requesting to create the CA-VN), the CMF may configure neighbor relationships for the CA-UPFs in the CA-VN, and generate a corresponding forwarding neighbor list and/or a corresponding advertisement neighbor list for each CA-UPF based on the neighbor relationships between the CA-UPFs. It may be understood that, if a CA-UPF is an ingress CA-UPF in the CA-VN, the CMF may generate a forwarding neighbor list for the CA-UPF; if a CA-UPF is an egress CA-UPF in the CA-VN, the CMF may generate an advertisement neighbor list for the CA-UPF; or if a CA-UPF is an ingress CA-UPF and an egress CA-UPF in the CA-VN, the CMF may generate a forwarding neighbor list and an advertisement neighbor list for the CA-UPF.

Further, the CMF may send the member list of the CA-VN and the forwarding neighbor list and/or the advertisement neighbor list of each CA-UPF to the SMF by using the second request message, to request the SMF to create the forwarding path in the CA-VN. In this embodiment of this application, the second request message is a request for the entire CA-VN. Therefore, after the SMF receives the second request message from the CMF, the SMF may request, based on the member list of the CA-VN, each CA-UPF in the CA-VN to create a virtual-network-level session of the CA-UPF. In other words, in a CA-VN creation process, the SMF may send an establishment request message of the virtual-network-level session to each CA-UPF in the CA-VN, to request to create the virtual-network-level session of the CA-UPF.

A process in which a CA-UPF creates a virtual-network-level session of the CA-UPF varies with a service role of the CA-UPF. For ease of description, in this embodiment of this application, the first CA-UPF and the second CA-UPF are used as examples to respectively describe how to establish virtual-network-level sessions of an ingress CA-UPF and an egress CA-UPF in the CA-VN in a CA-VN creation process. For another CA-UPF in the CA-VN, if the another CA-UPF is an ingress CA-UPF in the CA-VN, like the foregoing related descriptions provided when the first CA-UPF is an ingress CA-UPF, uplink forwarding tunnels required for forwarding paths between the another CA-UPF and the egress CA-UPFs may be established based on a forwarding neighbor list, and forwarding tunnel information corresponding to the egress CA-UPFs. Similarly, if the another CA-UPF is an egress CA-UPF in the CA-VN, like the foregoing related descriptions provided when the second CA-UPF is an egress CA-UPF, advertisement forwarding relationships between the another CA-UPF and the corresponding ingress CA-UPFs, and downlink forwarding tunnels required for implementing forwarding paths may be determined based on an advertisement neighbor list, and forwarding tunnel information corresponding to the ingress CA-UPFs. After creation of a virtual-network-level session of the another CA-UPF is completed, the another CA-UPF may send an establishment response message of the virtual-network-level session to the SMF, to indicate that the creation of the virtual-network-level session of the another CA-UPF is completed. It should be noted that names of an establishment request message and the session establishment response message of the virtual-network-level session of the CA-UPF other than the first CA-UPF and the second CA-UPF in the CA-VN may also be in forms similar to an $X^{th}$ request message and an $X^{th}$ response message. This is not limited in this application.

Further, after receiving response messages that indicate creation of virtual-network-level sessions is completed and that are fed back by all CA-UPFs in the CA-VN, the SMF may send the second response message (namely, the CA-VN session establishment response message) to the CMF.

It should be further noted that, in this embodiment of this application, a message used by a CA-UPF to feed back tunnel information to the SMF may be a response message in a session establishment procedure. In some embodiments, a name or a function of the response message may be similar to that of the third response message or the fourth response message in this embodiment of this application. Similarly, a tunnel information update message sent by the SMF to the CA-UPF may be a request message or an update message in the session establishment procedure. In some embodiments, a name or a function of the message may be similar to that of the third request message or the fourth request message in this embodiment of this application.

In a possible implementation scenario, a session establishment process of the first CA-UPF is used as an example. The SMF may send the third request message to the first CA-UPF. However, the third request message does not include the uplink forwarding tunnel information corresponding to the first CA-UPF and the egress CA-UPFs, but includes indication information for requesting the first CA-UPF to generate downlink forwarding tunnel information for the downlink forwarding tunnels between the egress CA-UPFs and the first CA-UPF. Therefore, the first CA-UPF may skip the tunnel establishment process shown in step S205-a, generate the downlink forwarding tunnel information for the downlink forwarding tunnels between the egress CA-UPFs and the first CA-UPF, and feed back the generated downlink forwarding tunnel information to the SMF by using the third response message. Herein, the third response message may not indicate that creation of the virtual-network-level session of the first CA-UPF is actually completed, but indicates that a session creation procedure is completed, although creation of the session has not been actually completed.

Subsequently, the SMF may send the third request message to the first CA-UPF again. The third request message includes the uplink forwarding tunnel information generated by the egress CA-UPFs of the first CA-UPF for the uplink forwarding tunnels between the first CA-UPF and the egress CA-UPFs. In this case, the third request message may be understood as the tunnel information update message mentioned above, and the third request message may be also for requesting the first CA-UPF to create the virtual-network-level session. In this way, after receiving the third request message, the first CA-UPF may perform the tunnel establishment process shown in step S205-a and send the third response message to the SMF again, to indicate that creation of the virtual-network-level session is completed. It can be learned that creation of the virtual-network-level session of the first CA-UPF is actually completed only after two session creation procedures are performed in this process.

According to some embodiments, the CMF may configure a group of CA-UPFs as members of the CA-VN by using the SMF, determine a corresponding forwarding neighbor list and/or a corresponding advertisement neighbor list and forwarding tunnel information for each CA-UPF, and establish a forwarding tunnel required for implementing uplink and downlink forwarding paths between an ingress CA-UPF and an egress CA-UPF.

In embodiments of this application, after creation of the CA-VN is completed, the CMF may further update the CA-VN by using the SMF. Updating the CA-VN includes a plurality of cases such as changing members of the CA-VN, for example, adding a new CA-UPF to the CA-VN or deleting an original CA-UPF in the CA-VN, or not changing members of the CA-VN but updating neighbor relationships between the members. It may be understood that, when the members of the CA-VN are changed, the neighbor relationships between the members in the CA-VN also change accordingly.

Figure 3:
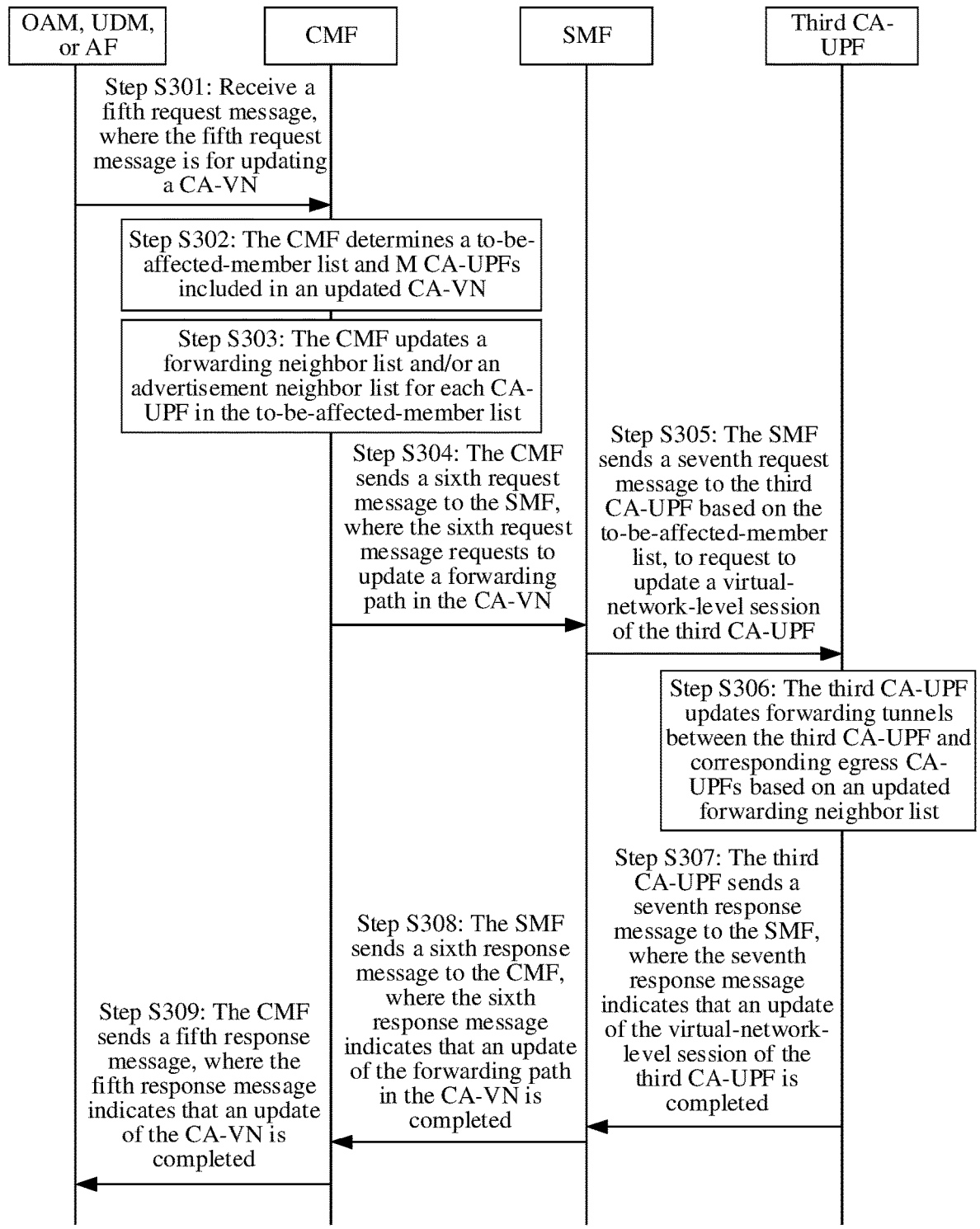
FIG. 3 is a schematic flowchart of a method for updating a computing aware-virtual network according to an embodiment of this application.

FIG. 3 shows an example of a process in which a CMF updates a CA-VN by using an SMF, and specifically relates to a case in which members of the CA-VN are changed.

As shown in FIG. 3, in step S301, the CMF receives a fifth request message, where the fifth request message is for requesting to update the CA-VN, and the fifth request message includes identification information of the CA-VN.

The fifth request message may also be referred to as a CA-VN update request message, or may have another name. This is not limited.

In some embodiments, the CMF may receive the fifth request message from an OAM, a UDM, or an AF (via a NEF).

In a possible implementation, the fifth request message may include the identification information of the CA-VN and a to-be-added-member list and/or a to-be-deleted-member list. The to-be-added-member list includes identification information of one or more CA-UPFs that need to be added to the CA-VN, and the to-be-deleted-member list includes identification information of one or more CA-UPFs that need to be deleted from the CA-VN. In this way, the CMF may determine, based on the to-be-added-member list and/or the to-be-deleted-member list, M CA-UPFs included in an updated CA-VN, where M is a positive integer.

It may be understood that, in this implementation, when a new member needs to be added to the CA-VN, the fifth request message includes the to-be-added-member list; or when an original member in the CA-VN needs to be deleted, the fifth request message includes the to-be-deleted-member list. Alternatively, it is possible that the fifth request message may always include the to-be-added-member list and the to-be-deleted-member list. However, when no new member needs to be added to the CA-VN, the to-be-added-member list in the fifth request message may be null. When no original member in the CA-VN needs to be deleted, the to-be-deleted-member list in the fifth request message may be null.

In another possible implementation, the fifth request message may include the identification information of the CA-VN and an updated member list, where the updated member list includes identification information of M CA-UPFs included in an updated CA-VN, and M is a positive integer. In this way, the CMF may directly determine, based on the updated member list, the M CA-UPFs included in the updated CA-VN.

It should be noted that, when the CA-VN is updated, a new member may be added to the CA-VN, or an original member in the CA-VN may be deleted. Therefore, the quantity of CA-UPFs included in the CA-VN before the update is not necessarily different from the quantity of CA-UPFs included in the CA-VN after the update. For example, if the quantity of new CA-UPFs added to the CA-VN is equal to the quantity of original CA-UPFs deleted from the CA-VN, the quantity of CA-UPFs included in the CA-VN before the update is the same as the quantity of CA-UPFs included in the CA-VN after the update. In other words, before and after the CA-VN is updated, the quantities of CA-UPFs included in the CA-VN may be the same, or may be different. In other words, the values of N and M may be the same or different. This is not limited.

In step S302, the CMF determines a to-be-affected-member list and the M CA-UPFs included in the updated CA-VN, where the to-be-affected-member list includes identification information of one or more CA-UPFs for which a forwarding neighbor list and/or an advertisement neighbor list need/needs to be updated.

In step S303, the CMF updates a forwarding neighbor list and/or an advertisement neighbor list for each CA-UPF in the to-be-affected-member list.

The one or more CA-UPFs for which a forwarding neighbor list and/or an advertisement neighbor list need/needs to be updated may include: a CA-UPF added to the CA-VN, a CA-UPF deleted from the CA-VN, and another CA-UPF that has a neighbor relationship with the added CA-UPF or the deleted CA-UPF.

Specifically, updating the forwarding neighbor list and/or the advertisement neighbor list for the CA-UPF in the to-be-affected-member list includes:

If new CA-UPFs need to be added to the CA-VN, the CMF may generate a forwarding neighbor list and/or an advertisement neighbor list for each added CA-UPF. If original CA-UPFs in the CA-VN need to be deleted, the CMF may delete or clear a forwarding neighbor list and/or an advertisement neighbor list of each CA-UPF that needs to be deleted.

When the members of the CA-VN change, neighbor relationships between CA-UPFs (namely, original and undeleted CA-UPFs in the CA-VN) other than the added CA-UPF included in the updated CA-VN may also change accordingly. Therefore, forwarding neighbor lists and/or advertisement neighbor lists of the other CA-UPFs need to be adaptively adjusted. For example, the CMF may add a to-be-added CA-UPF to a forwarding neighbor list and/or an advertisement neighbor list of another CA-UPF that has a neighbor relationship with the to-be-added CA-UPF. Specifically, the CMF adds the to-be-added CA-UPF to a forwarding neighbor list of an ingress CA-UPF corresponding to the to-be-added CA-UPF, and adds the to-be-added CA-UPF to an advertisement neighbor list of an egress CA-UPF corresponding to the to-be-added CA-UPF. For another example, the CMF may delete a to-be-deleted CA-UPF from a forwarding neighbor list and/or an advertisement neighbor list of another CA-UPF that has a neighbor relationship with the to-be-deleted CA-UPF. Specifically, the CMF deletes the to-be-deleted CA-UPF from a forwarding neighbor list of an ingress CA-UPF corresponding to the to-be-deleted CA-UPF, and deletes the to-be-deleted CA-UPF from an advertisement neighbor list of an egress CA-UPF corresponding to the to-be-deleted CA-UPF.

It may be understood that, for a CA-UPF in the to-be-affected-member list, the CMF needs to update a forwarding neighbor list for the CA-UPF only when a forwarding neighbor of the CA-UPF changes; and the CMF needs to update an advertisement neighbor list for the CA-UPF only when an advertisement neighbor of the CA-UPF changes. For example, if a CA-UPF added to the CA-VN may be used as an ingress CA-UPF, the CMF may configure a forwarding neighbor relationship for the CA-UPF, and accordingly generate a forwarding neighbor list; if the CA-UPF may be used as an egress CA-UPF, the CMF may configure an advertisement neighbor relationship for the CA-UPF, and accordingly generate an advertisement neighbor list; or if the CA-UPF may be used as the ingress CA-UPF and the egress CA-UPF, the CMF may configure a forwarding neighbor relationship and an advertisement neighbor relationship for the CA-UPF, and accordingly generate a forwarding neighbor list and an advertisement neighbor list.

In some embodiments, the CMF may further actively adjust the neighbor relationship between the other original and undeleted CA-UPFs in the CA-VN, accordingly include the CA-UPFs in the to-be-affected-member list, and accordingly update forwarding neighbor lists and/or advertisement neighbor lists.

In step S304, the CMF sends a sixth request message to the SMF, where the sixth request message is for requesting to update a forwarding path in the CA-VN, and the sixth request message includes the identification information of the CA-VN, the to-be-affected-member list, and an updated forwarding neighbor list and/or advertisement neighbor list of each CA-UPF in the to-be-affected-member list.

Accordingly, the SMF receives the sixth request message from the CMF.

It should be noted that, if only a forwarding neighbor list is updated for a CA-UPF in the to-be-affected-member list, the sixth request message may include only an updated forwarding neighbor list of the CA-UPF, and include no advertisement neighbor list. Similarly, if only an advertisement neighbor list is updated for the CA-UPF, the sixth request message may include only an updated advertisement neighbor list of the CA-UPF, and include no forwarding neighbor list.

Alternatively, it is possible that the sixth request message may always include an updated forwarding neighbor list and advertisement neighbor list of the CA-UPF. However, if a forwarding neighbor list of the CA-UPF is not updated, the updated forwarding neighbor list of the CA-UPF included in the sixth request message may be the original forwarding neighbor list of the CA-UPF. In some embodiments, the forwarding neighbor list may be marked as not updated. Similarly, if an advertisement neighbor list of the CA-UPF is not updated, the updated advertisement neighbor list of the CA-UPF included in the sixth request message may be the original advertisement neighbor list of the CA-UPF. In some embodiments, the advertisement neighbor list may be marked as not updated.

For example, if a CA-UPF added to the CA-VN may be used only as an ingress CA-UPF, the sixth request message may include a forwarding neighbor list of the CA-UPF, and include no advertisement neighbor list, or an advertisement neighbor list of the CA-UPF is null or marked as not updated.

The sixth request message may also be referred to as a CA-VN session update request message, or may have another name. This is not limited.

In step S305, the SMF sends a seventh request message to a third CA-UPF, where the sixth request message is for requesting to update a virtual-network-level session of the third CA-UPF, and the seventh request message includes the identification information of the CA-VN and an updated forwarding neighbor list and/or advertisement neighbor list of the third CA-UPF.

Accordingly, the third CA-UPF may receive the seventh request message from the SMF.

In this embodiment of this application, the third CA-UPF is a CA-UPF in the to-be-affected-member list. If the third CA-UPF is an ingress CA-UPF in the CA-VN, and a forwarding neighbor list of the third CA-UPF is updated, the seventh request message may include the updated forwarding neighbor list of the third CA-UPF. In some embodiments, the SMF may update information about forwarding tunnels between the third CA-UPF and corresponding egress CA-UPFs based on the updated forwarding neighbor list of the third CA-UPF, and send the information to the third CA-UPF by using the seventh request message, so that the third CA-UPF updates the uplink forwarding tunnels between the third CA-UPF and the corresponding egress CA-UPFs.

If the third CA-UPF is an egress CA-UPF in the CA-VN, and an advertisement neighbor list of the third CA-UPF is updated, the seventh request message may include the updated advertisement neighbor list of the third CA-UPF. In some embodiments, the SMF may update advertisement forwarding relationships and information about forwarding tunnels between the third CA-UPF and corresponding ingress CA-UPFs based on the updated advertisement neighbor list of the third CA-UPF, and send the advertisement forwarding relationships and the information to the third CA-UPF by using the seventh request message, so that the third CA-UPF updates the downlink forwarding tunnels between the third CA-UPF and the corresponding ingress CA-UPFs.

Alternatively, it is possible that the seventh request message may include a forwarding neighbor list and an advertisement neighbor list of the third CA-UPF if the third CA-UPF is an ingress CA-UPF and an egress CA-UPF in the CA-VN. However, if the forwarding neighbor list of the third CA-UPF is not updated, the forwarding neighbor list included in the seventh request message may be the original forwarding neighbor list of the third CA-UPF. In addition, in this case, the seventh request message does not include information about updated forwarding tunnels between the third CA-UPF and egress CA-UPFs. Similarly, if the advertisement neighbor list of the third CA-UPF is not updated, the advertisement neighbor list included in the seventh request message may be the original advertisement neighbor list of the third CA-UPF. In addition, in this case, the seventh request message does not include information about updated forwarding tunnels between the third CA-UPF and ingress CA-UPFs.

The seventh request message may also be referred to as an update request message of a virtual-network-level session, or may have another name. This is not limited.

In step S306, the third CA-UPF updates the forwarding tunnels between the third CA-UPF and the corresponding egress CA-UPFs based on the updated forwarding neighbor list, where the forwarding tunnels are specifically uplink forwarding tunnels.

In a possible implementation, a regional dynamic session unit in the third CA-UPF may determine, based on the identification information of the CA-VN, an internal interface corresponding to the CA-VN in the third CA-UPF, and then update forwarding relationships between the internal interface corresponding to the CA-VN and external interfaces of the third CA-UPF (for example, N19 interfaces between the third CA-UPF and the corresponding egress CA-UPFs and N6 interfaces between the third CA-UPF and associated edge computing nodes) based on the updated forwarding neighbor list of the third CA-UPF and the information about the updated forwarding tunnels between the third CA-UPF and the egress CA-UPFs.

The third CA-UPF may further update the advertisement forwarding relationships and the forwarding tunnels between the third CA-UPF and the corresponding ingress CA-UPFs based on the updated advertisement neighbor list, where the forwarding tunnels are specifically downlink forwarding tunnels.

In step S307, the third CA-UPF sends a seventh response message to the SMF, where the seventh response message indicates that an update of the virtual-network-level session of the third CA-UPF is completed.

Accordingly, the SMF receives the seventh response message from the third CA-UPF.

The seventh response message may also be referred to as an update response message of the virtual-network-level session or an update complete message of the virtual-network-level session, or may have another name. This is not limited.

In step S308, the SMF sends a sixth response message to the CMF, where the sixth response message indicates that an update of the forwarding path in the CA-VN is completed.

Accordingly, the CMF may receive the sixth response message from the SMF.

The sixth response message may also be referred to as a CA-VN session update response message or a CA-VN session update complete message, or may have another name. This is not limited.

In step S309, the CMF may send a fifth response message, where the fifth response message indicates that an update of the CA-VN is completed.

In some embodiments, the CMF may send the fifth response message to the OAM or the AF via the NEF.

The fifth response message may also be referred to as a CA-VN update response message or a CA-VN update complete message, or may have another name. This is not limited.

It should be noted that, in step S305 to step S307, the third CA-UPF is used as an example to describe how to update virtual-network-level sessions of CA-UPFs in an updated CA-VN in a process of updating the CA-VN. Therefore, it may be understood that, in a CA-VN update process, the SMF may send the update request message of the virtual-network-level session to each original CA-UPF in the CA-VN in the to-be-affected-member list, to request to update a virtual-network-level session of the CA-UPF. As described in step S305 to step S307, if a forwarding neighbor list of the original CA-UPF in the CA-VN in the to-be-affected-member list is updated, uplink forwarding tunnels between the CA-UPF and corresponding egress CA-UPFs may be updated based on an updated forwarding neighbor list of the CA-UPF and information about updated forwarding tunnels between the CA-UPF and the egress CA-UPFs; or if an advertisement neighbor list of the original CA-UPF in the CA-VN in the to-be-affected-member list is updated, advertisement forwarding relationships and downlink forwarding tunnels between the CA-UPF and corresponding ingress CA-UPFs may be updated based on an updated advertisement neighbor list of the CA-UPF and information about updated forwarding tunnels between the CA-UPF and the ingress CA-UPFs, to complete an update of the virtual-network-level session, and send an update response message of the virtual-network-level session to the SMF, to indicate that the update of the virtual-network-level session of the CA-UPF is completed.

The SMF may further send an establishment request message of a virtual-network-level session to each to-be-added CA-UPF in the to-be-affected-member list, to request to establish the virtual-network-level session of the CA-UPF. As described in step S206 and step S207, if the to-be-added CA-UPF may be used as an ingress CA-UPF, uplink forwarding tunnels between the to-be-added CA-UPF and corresponding egress CA-UPFs may be established based on a forwarding neighbor list and information about the forwarding tunnels between the to-be-added CA-UPF and the egress CA-UPFs; or if the to-be-added CA-UPF may be used as an egress CA-UPF, advertisement forwarding relationships and downlink forwarding tunnels between the to-be-added CA-UPF and corresponding ingress CA-UPFs may be determined based on an advertisement neighbor list and information about the forwarding tunnels between the to-be-added CA-UPF and the ingress CA-UPFs, to complete creation of the virtual-network-level session, and send an establishment response message of the virtual-network-level session to the SMF, to indicate that creation of the virtual-network-level session of the CA-UPF is completed.

The SMF may further send a deletion request message of a virtual-network-level session to each to-be-deleted CA-UPF in the to-be-affected-member list, to request to delete the virtual-network-level session of the CA-UPF. The to-be-deleted CA-UPF may delete forwarding tunnels (including uplink forwarding tunnels and downlink forwarding tunnels) and an advertisement forwarding relationship that correspond to the CA-VN, and send a deletion response message of the virtual-network-level session to the SMF, to indicate that the virtual-network-level session of the CA-UPF has been deleted.

Compared with the case in which the members of the CA-VN are changed in FIG. 3, in a case in which the members of the CA-VN are not changed and only the neighbor relationships between the members of the CA-VN are modified, the CMF may decide, without being triggered by the fifth request message received from the OAM, the UDM, or the AF (via the NEF), to update the CA-VN. In this way, after determining to update the CA-VN, the CMF may update forwarding neighbor lists and/or advertisement neighbor lists of to-be-affected CA-UPFs, and then send the CA-VN session update request message to the SMF. For a subsequent specific process, refer to related descriptions in step S302 to step S308. Details are not described again.

The following uses a first CA-UPF and a second CA-UPF as an example to describe a process of computing routing information generation and user plane packet forwarding in a CA-VN that are performed after creation or an update of the CA-VN is completed.

It is assumed that the first CA-UPF is one of CA-UPFs in the CA-VN, the first CA-UPF may be an ingress CA-UPF in the CA-VN, the first CA-UPF may correspond to L egress CA-UPFs, and the second CA-UPF is one of the L egress CA-UPFs corresponding to the first CA-UPF. It may be understood that, from a perspective of the second CA-UPF, the second CA-UPF may correspond to K ingress CA-UPFs, and the first CA-UPF is one of the K ingress CA-UPFs corresponding to the second CA-UPF. L and K are positive integers.

Figure 4:
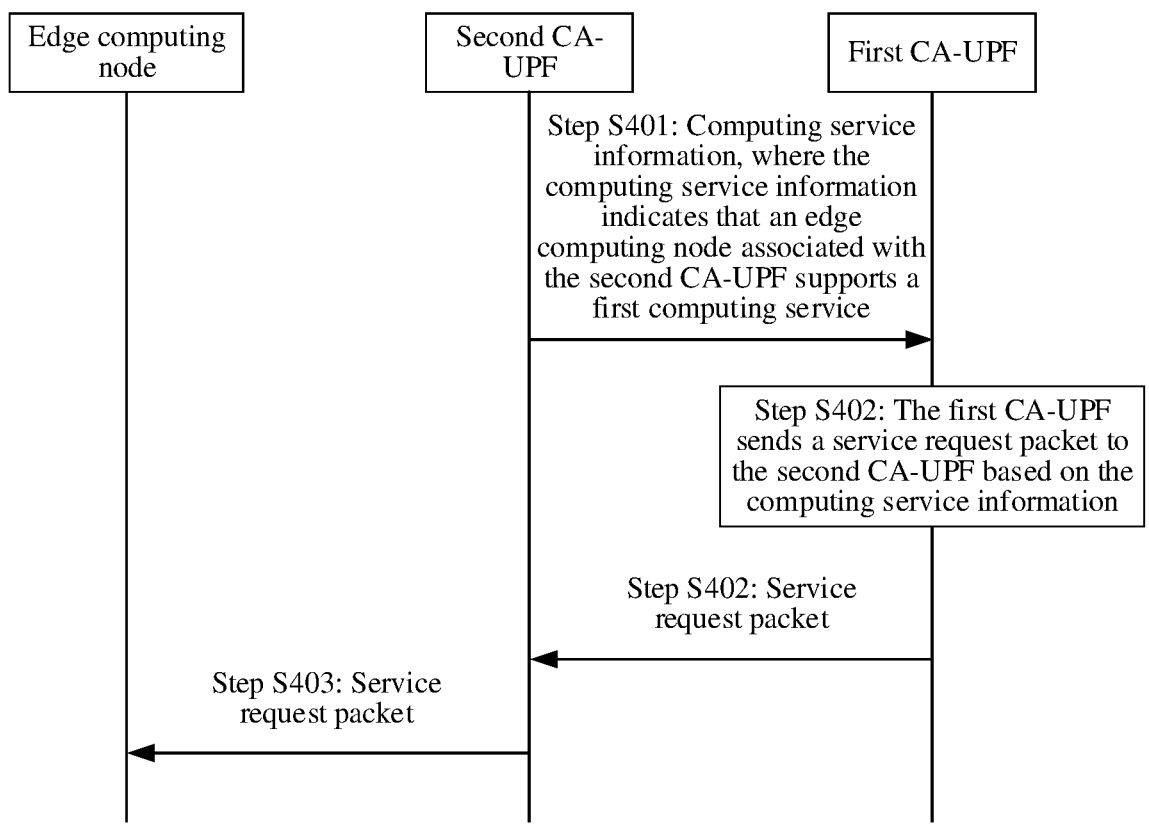
FIG. 4 is a schematic flowchart of a computing aware-session management method according to an embodiment of this application.

FIG. 4 shows a method for managing a session between edge computing nodes according to an embodiment of this application. The method includes the following steps.

Step S401: A second CA-UPF sends computing service information to a first CA-UPF, where the computing service information indicates that an edge computing node associated with the second CA-UPF supports a first computing service.

Accordingly, the first CA-UPF may receive the computing service information from the second CA-UPF.

In this embodiment of this application, before sending the computing service information to the first CA-UPF, the second CA-UPF may receive the computing service information from the associated edge computing node.

The computing service information may include a service identifier of the first computing service, a service attribute of the first computing service, a running status of the first computing service, and computing resource information of the first computing service. A service identifier refers to an identity of a computing service, and is in a one-to-one correspondence with a computing service name A service attribute indicates whether the computing service is stateful or stateless. If the computing service is a stateless service, service instances at different locations may be selected for all times of requests of the computing service. If the computing service is a stateful service, because a plurality of times of requests are associated, it needs to be ensured that all times of requests of the computing service access a service instance at a same location. A running status refers to a status indication of a service instance (for example, a microservice or a function instance) of the computing service currently in a server of the edge computing node, and includes statuses such as loaded, unloaded, running, suspended, available, and unavailable. Computing resource information refers to a type and an attribute of a computing resource currently used by the service instance of the computing service in a server of an edge computing node that specifically runs the service instance. The computing resource information may include one or more specific indicator information such as a processor type, overall memory usage, the quantity of used service sessions, the quantity of times of requests per second, and a computing delay. The processor type may be a central processing unit (CPU), a graphics processing unit (GPU), and a neural network processing unit (NPU). Alternatively, the computing resource information may be comprehensive indicator information obtained through calculation based on the specific indicator information, or the like.

In some embodiments, the second CA-UPF may send, to the first CA-UPF, load information of the edge computing node associated with the second CA-UPF. The load information is for representing an overall load status of the edge computing node. Similarly, before sending the load information to the first CA-UPF, the second CA-UPF may receive the load information of the edge computing node from the associated edge computing node.

It should be noted that the computing service information and the load information may be sent in a same message, or may be sent in different messages. This is not limited in this application. Both the computing service information and the load information may be for representing a capability of the edge computing node associated with the second CA-UPF to externally provide a computing service. Therefore, in this embodiment of this application, the computing service information and the load information of the edge computing node may be collectively referred to as service capability information of the edge computing node.

In some embodiments, the second CA-UPF may further receive, from the edge computing node associated with the second CA-UPF, the service identifier of the first computing service and a first server IP address corresponding to the service identifier of the first computing service, and record a mapping relationship between the service identifier of the first computing service and the first server IP address, to facilitate subsequent mutual replacement between the service identifier of the first computing service and the first server IP address. The first server IP address is an IP address of a server running the first computing service on the edge computing node.

Step S402: The first CA-UPF sends a service request packet to the second CA-UPF based on the computing service information received from the second CA-UPF.

Accordingly, the second CA-UPF receives the service request packet from the first CA-UPF.

In some embodiments, before sending the service request packet to the second CA-UPF, the first CA-UPF may receive the service request packet from the terminal device, where the service request packet is for requesting the first computing service. The service request packet carries the service identifier of the first computing service. In some embodiments, a source IP address of the service request packet is an IP address of the terminal device, and a destination IP address is the service identifier of the first computing service.

In this embodiment of this application, the first CA-UPF may learn, based on the computing service information received from the second CA-UPF, that the edge computing node associated with the second CA-UPF can support the first computing service, thereby deciding to request the first computing service from the second CA-UPF, and determining to send the service request packet to the second CA-UPF.

Alternatively, the first CA-UPF may learn, based on the computing service information and the load information that are received from the second CA-UPF, that the edge computing node associated with the second CA-UPF can support the first computing service and the load status of the edge computing node can support a new computing service request, thereby deciding to request the first computing service from the second CA-UPF, and determining to send the service request packet to the second CA-UPF.

In a possible implementation, the first CA-UPF may generate or update computing routing information of the first computing service based on one or more of the computing service information and the load information that are received from the second CA-UPF, and network cost information between the first CA-UPF and the second CA-UPF. The computing routing information of the first computing service may include the service identifier of the first computing service, identification information of the second CA-UPF, the computing service information corresponding to the second CA-UPF (to be specific, the computing service information of the edge computing node associated with the second CA-UPF), the load information corresponding to the second CA-UPF (to be specific, the load information of the edge computing node associated with the second CA-UPF), and the network cost information between the first CA-UPF and the second CA-UPF. The network cost information between the first CA-UPF and the second CA-UPF may be determined by the first CA-UPF based on one or more of a delay, bandwidth, or jitter between the first CA-UPF and the second CA-UPF, and may include one or more specific indicators such as the delay, the bandwidth, and the jitter, or may include a comprehensive indicator determined based on the specific indicators such as the delay, the bandwidth, or the jitter. This is not limited.

It should be noted that, if a CA-UPF (for example, a fourth CA-UPF) other than the second CA-UPF among egress CA-UPFs corresponding to the first CA-UPF can also provide the first computing service, the first CA-UPF may also receive, from the fourth CA-UPF, computing service information and load information of an edge computing node associated with the fourth CA-UPF, and generate or update the computing routing information of the first computing service based on one or more of the computing service information, the load information, and network cost information that correspond to the fourth CA-UPF. Accordingly, the computing routing information of the first computing service may further include identification information of the fourth CA-UPF that can provide the first computing service, the computing service information corresponding to the fourth CA-UPF, the load information corresponding to the fourth CA-UPF, and the network cost information between the first CA-UPF and the fourth CA-UPF.

In other words, the computing routing information of the first computing service may include the service identifier of the first computing service, identification information of one or more egress CA-UPFs that can provide the first computing service and that are among the egress CA-UPFs of the first CA-UPF, and computing service information, load information, and network cost information that correspond to each egress CA-UPF. In addition, the first CA-UPF may dynamically update the computing routing information of the first computing service in real time depending on whether edge computing nodes associated with the egress CA-UPFs corresponding to the first CA-UPF support the first computing service and based on load statuses of the edge computing nodes and dynamic changes of statuses of network connections between the first CA-UPF and the corresponding egress CA-UPFs.

Further, after receiving the service request packet from the terminal device, the first CA-UPF may select, based on the computing routing information of the first computing service, the second CA-UPF from the one or more egress CA-UPFs that can provide the first computing service and that correspond to the first CA-UPF, to request the first computing service, and forward the service request packet to the second CA-UPF. For example, when the edge computing node associated with the second CA-UPF has low load, abundant computing resources, or a good network connection status, the first CA-UPF may choose to forward the service request packet to the second CA-UPF, to request the first computing service deployed on the edge computing node associated with the second CA-UPF.

In some embodiments, the first CA-UPF may send the service request packet to the second CA-UPF according to a packet matching and forwarding rule corresponding to the second CA-UPF. The packet matching and forwarding rule corresponding to the second CA-UPF may be determined based on one or more of the computing service information, the load information, the network cost information, and forwarding tunnel information that correspond to the second CA-UPF.

Step S403: The second CA-UPF sends the service request packet to the edge computing node.

Accordingly, the edge computing node may receive the service request packet from the second CA-UPF.

In this embodiment of this application, the second CA-UPF may replace the service identifier of the first computing service that is carried in the service request packet with the first server IP address based on the recorded mapping relationship between the service identifier of the first computing service and the first server IP address, and then forward the service request packet to the edge computing node. In some embodiments, the second CA-UPF may replace the original service identifier of the first computing service with the first server IP address for the destination IP address of the service request packet based on the recorded mapping relationship between the service identifier of the first computing service and the first server IP address, and then send, to the edge computing node, the service request packet whose destination IP address is translated.

After the edge computing node completes the first computing service, the edge computing node may send a service response packet to the second CA-UPF, where a source IP address of the service response packet is the first server IP address, and a destination IP address of the service response packet is the IP address of the terminal device. After receiving the service response packet from the edge computing node, the second CA-UPF may replace the first server IP address carried in the service response packet with the service identifier of the first computing service based on the recorded mapping relationship between the service identifier of the first computing service and the first server IP address, and then forward the service response packet to the first CA-UPF. In some embodiments, the second CA-UPF may replace the original first server IP address with the service identifier of the first computing service for the source IP address of the service response packet based on the recorded mapping relationship between the service identifier of the first computing service and the first server IP address, and then send, to the first CA-UPF, the service response packet whose source IP address is translated. Finally, after receiving the service response packet from the second CA-UPF, the first CA-UPF may forward the service response packet to the terminal device.

It can be learned that, in embodiments of this application, the plurality of edge computing nodes may form the regional computing group by constructing the computing aware-virtual network. Computing service information and load information of the edge computing nodes may be quickly advertised between the computing aware-user plane functions in the computing aware-virtual network. The computing aware-user plane function may forward the service request packet of the terminal device to an appropriate edge computing node based on dynamically changing computing service information, to implement interconnection and cooperation between the edge computing nodes, and improve resource utilization of a system.

The following describes in detail, by using a specific example, a process in which the ingress CA-UPF in the CA-VN establishes the computing routing information base.

Figure 5:
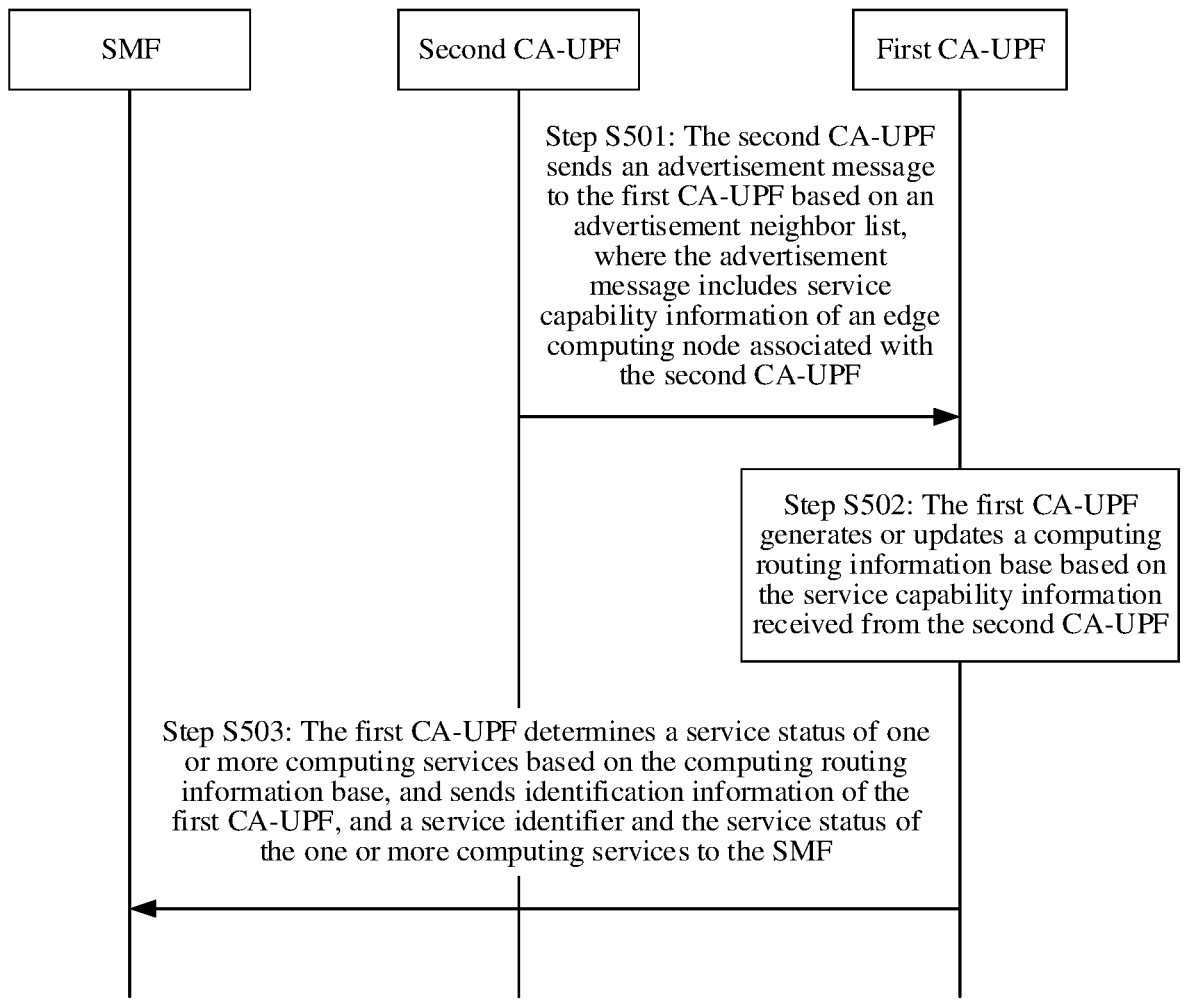
FIG. 5 is a schematic diagram of establishing a computing routing information base by a first CA-UPF through information exchanges with a second CA-UPF according to an embodiment of this application.

FIG. 5 shows an example of a process in which a first CA-UPF establishes a computing routing information base through information exchanges with a second CA-UPF. As shown in FIG. 5, the process includes the following steps.

Step S501: The second CA-UPF sends an advertisement message to the first CA-UPF based on an advertisement neighbor list, where the advertisement message includes service capability information of an edge computing node associated with the second CA-UPF, and the service capability information may include computing service information and/or load information of the edge computing node.

Accordingly, the first CA-UPF may receive the advertisement message from the second CA-UPF.

In this embodiment of this application, the second CA-UPF may send, based on the advertisement neighbor list, the advertisement message to each ingress CA-UPF corresponding to the second CA-UPF. Another ingress CA-UPF corresponding to the second CA-UPF may establish a computing routing information base of the ingress CA-UPF with reference to the following related descriptions of the first CA-UPF in embodiments of this application. Details are not described again in this application.

Specifically, the computing service information includes a service identifier, a service attribute, a running status, and computing resource information of one or more computing services deployed on the edge computing node, and is for representing computing services supported by the edge computing node. The load information of the edge computing node refers to overall load information of the edge computing node, and is for representing a load status of the edge computing node.

It should be noted that, in this embodiment of this application, the one or more computing services may be deployed on the edge computing node associated with the second CA-UPF. Computing service information of different computing services may be advertised together (where for example, computing service information of a plurality of computing services is advertised by using a same advertisement message), or may be advertised separately (where for example, computing service information of a plurality of computing services is separately advertised by using a separate advertisement message). This is not limited in this application.

Alternatively, the computing service information and the load information of the edge computing node may be advertised together, or may be advertised separately. This is not limited in this application either. This means, one advertisement message may include only the computing service information of the edge computing node, may include only the load information of the edge computing node, or may include the computing service information and the load information of the edge computing node.

In addition, the service capability information may be set to be periodically advertised. Alternatively, the service capability information is immediately advertised after the second CA-UPF receives the service capability information from the associated edge computing node. Alternatively, the service capability information is advertised after it is determined that the service capability information received from the associated edge computing node satisfies a specified condition. For example, service statuses of some computing services change, some indicators in the computing service information reach specified thresholds, or the load status of the edge computing node changes.

It can be learned that, the service capability information of the edge computing node associated with the second CA-UPF is advertised to the first CA-UPF, so that the first CA-UPF can learn of information such as computing services that can be provided by the edge computing node associated with the second CA-UPF, computing service information of the computing services, and the load status of the edge computing node.

Figure 6:
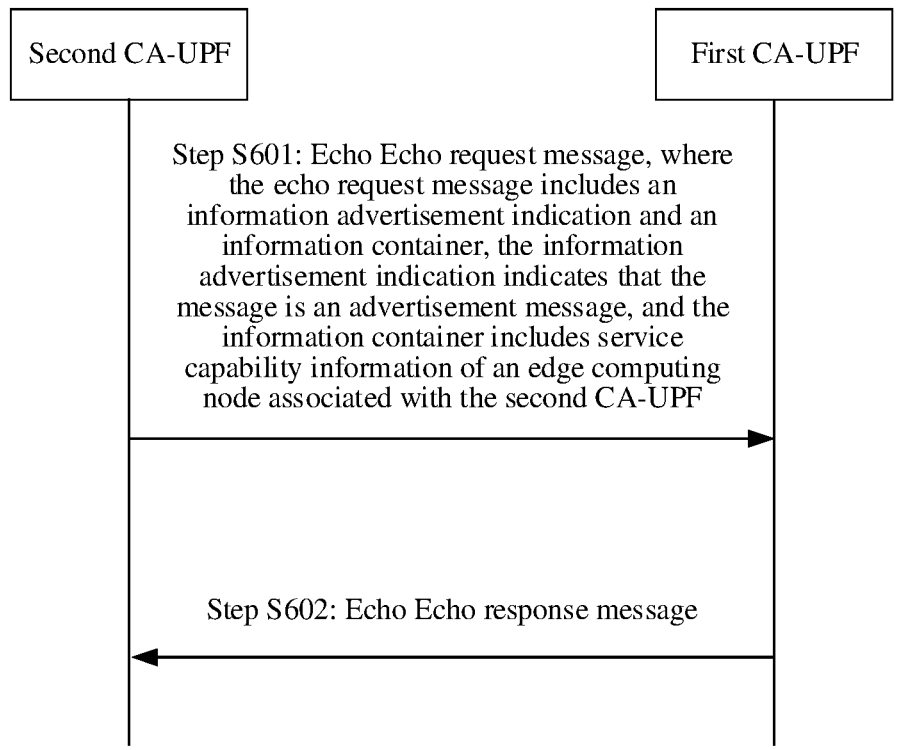
FIG. 6 shows a possible implementation in which a second CA-UPF sends an advertisement message to a first CA-UPF according to an embodiment of this application.

In some embodiments, the advertisement message may be implemented by extending an echo message defined by 3GPP. In a possible implementation, the second CA-UPF may actively send the advertisement message to the first CA-UPF. For example, as shown in FIG. 6, in step S601, the second CA-UPF may send an echo request message to the first CA-UPF, where the echo request message includes an information advertisement indication and an information container. The information advertisement indication indicates that the message is an advertisement message, and notifies the first CA-UPF to receive content in the information container. The information container includes the service capability information of the edge computing node associated with the second CA-UPF, for example, the computing service information of the one or more computing services and the load information of the edge computing node. In step S602, after receiving the echo request message, the first CA-UPF may send an echo response message to the second CA-UPF.

Figure 7:
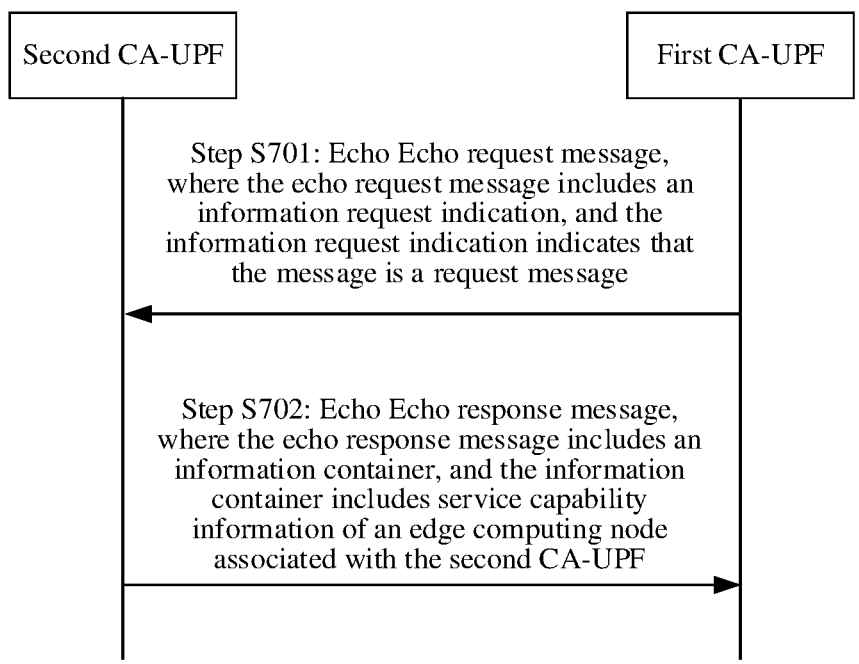
FIG. 7 shows another possible implementation in which a second CA-UPF sends an advertisement message to a first CA-UPF according to an embodiment of this application.

In another possible implementation, the first CA-UPF may actively request the service capability information from the second CA-UPF based on a forwarding neighbor list of the first CA-UPF. Then the second CA-UPF sends the advertisement message to the first CA-UPF in response to the request of the first CA-UPF. For example, as shown in FIG. 7, in step S701, the first CA-UPF may send an echo request message to the second CA-UPF, where the echo request message includes an information request indication. The information request indication indicates that the message is a request message and specifically for requesting the service capability information of the edge computing node associated with the second CA-UPF. In some embodiments, the echo request message further includes an information container, and the information request indication further notifies the second CA-UPF to return the service capability information of the edge computing node by using the information container. In step S702, after receiving the echo request message, the second CA-UPF may send an echo response message to the first CA-UPF, where the echo response message includes the information container, and the information container includes the service capability information of the edge computing node associated with the second CA-UPF, for example, the computing service information related to the one or more computing services and the load information of the edge computing node.

In some embodiments, it is assumed that a first computing service is deployed on the edge computing node associated with the second CA-UPF. Before the second CA-UPF advertises, to the first CA-UPF through step S501, computing service information related to the first computing service, the second CA-UPF may establish an association with the first computing service through a procedure shown in FIG. 8, and record a mapping relationship between a service identifier of the first computing service and a corresponding IP address of a server in which a service instance of the first computing service is located.

Figure 8:
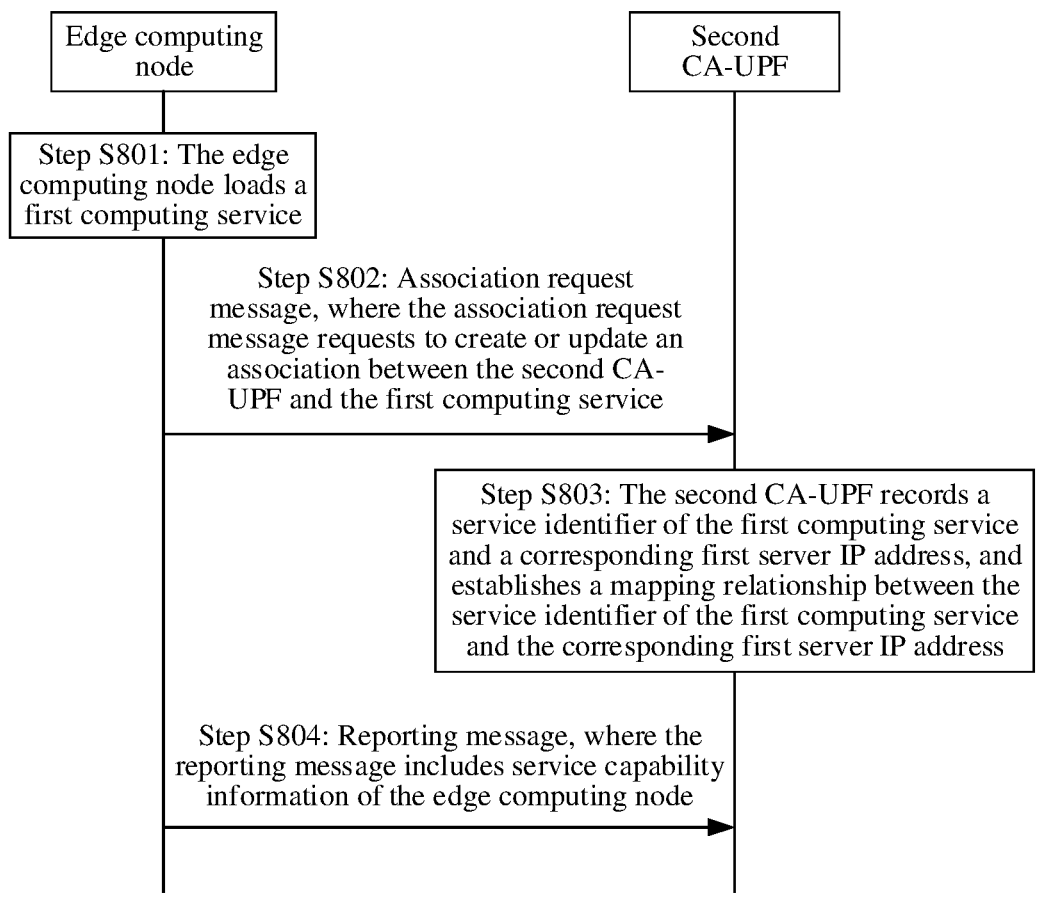
FIG. 8 is a schematic diagram of establishing an association with a first computing service by a second CA-UPF according to an embodiment of this application.

Specifically, as shown in FIG. 8, in step S801, the edge computing node may load the first computing service. In step S802, the edge computing node may send an association request message to the second CA-UPF, where the association request message is for requesting to create or update the association between the second CA-UPF and the first computing service, the association request message includes the service identifier of the first computing service and a first server IP address, and the first server IP address is the IP address of the server running the service instance of the first computing service on the edge computing node. The association request message may also be referred to as a service binding request message, or may have another name. This is not limited in this application. Accordingly, the second CA-UPF may receive the association request message from the edge computing node. In step S803, the second CA-UPF may record the service identifier of the first computing service and the corresponding first server IP address, and establish the mapping relationship between the service identifier of the first computing service and the corresponding first server IP address, to facilitate subsequent mutual replacement between the service identifier of the first computing service and the first server IP address. In step S804, the edge computing node may send a reporting message to the second CA-UPF, where the reporting message includes the service capability information of the edge computing node. The service capability information includes the computing service information related to the first computing service, for example, the service identifier of the first computing service, a service attribute of the first computing service, a running status of the first computing service, and computing resource information of the first computing service. In some embodiments, the service capability information may further include current load information of the edge computing node.

Figure 9:
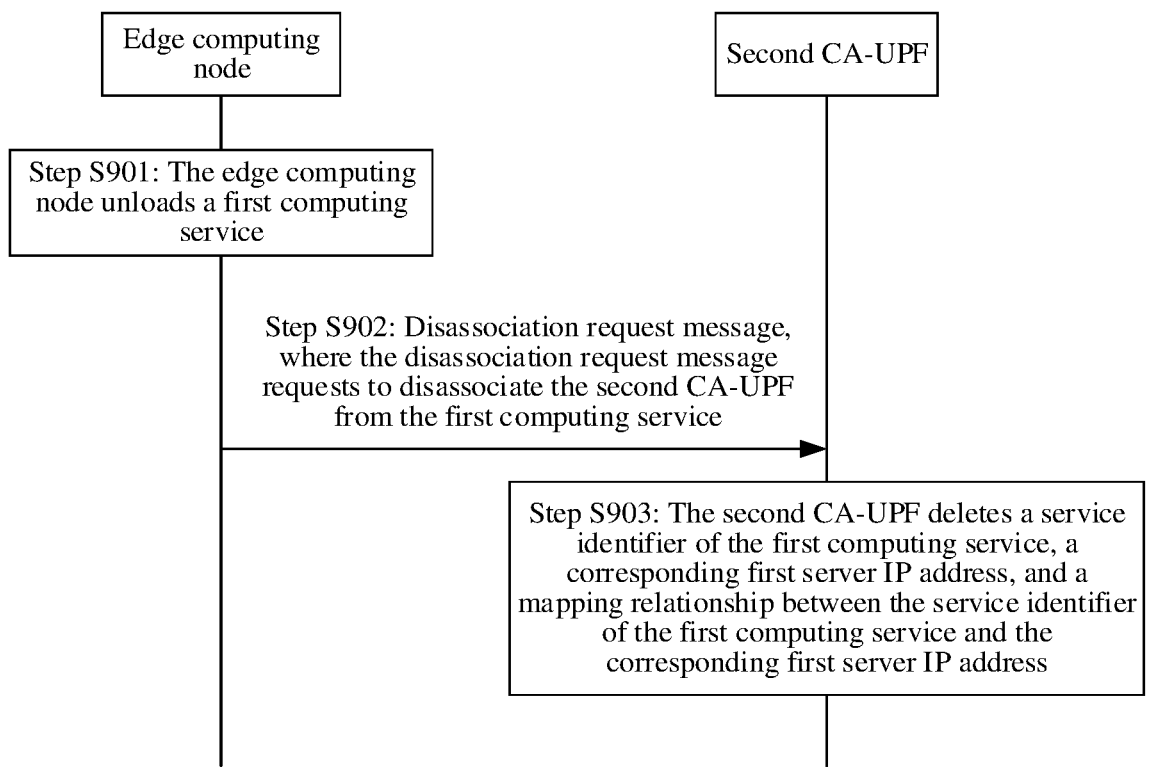
FIG. 9 is a schematic diagram of disassociating with a first computing service by a second CA-UPF according to an embodiment of this application.

If the edge computing node unloads the first computing service subsequently, the second CA-UPF may further disassociate with the first computing service through the procedure shown in FIG. 9. This is similar to the procedure shown in FIG. 8. Specifically, as shown in FIG. 9, in step S901, the edge computing node may unload the first computing service. In step S902, the edge computing node may send a disassociation request message to the second CA-UPF, where the disassociation request message is for requesting to disassociate the second CA-UPF from the first computing service, and the disassociation request message includes the service identifier of the first computing service and the first server IP address. Accordingly, the second CA-UPF may receive the disassociation request message from the edge computing node. The disassociation request message may also be referred to as a service unbinding request message, or may have another name. This is not limited in this application. In step S903, the second CA-UPF may delete the service identifier of the first computing service and the corresponding first server IP address that are recorded and the mapping relationship between the service identifier of the first computing service and the corresponding first server IP address.

It should be noted that, in a specific implementation process of the foregoing procedure, the actions performed by the edge computing node in step S801, step S802, step S901, and step S902 may be specifically performed by an MEC platform in the edge computing node, and the actions performed by the second CA-UPF in step S803, step S804, and step S903 may be specifically performed by a computing aware-processing unit in the second CA-UPF.

Step S502: The first CA-UPF generates or updates the computing routing information base based on the service capability information received from the second CA-UPF, where the computing routing information base includes computing routing information of one or more computing services.

In some embodiments, the first CA-UPF may generate or update the computing routing information base based on the service capability information received from the second CA-UPF and network cost information between the first CA-UPF and the second CA-UPF. It should be noted that a method for obtaining the network cost information between the first CA-UPF and the second CA-UPF is not specifically limited in this application. In addition, during specific implementation, step S502 may be performed by a computing aware-processing unit in the first CA-UPF.

Computing routing information of a computing service may include a service identifier of the computing service, identification information of one or more egress CA-UPFs that can provide the computing service, computing service information such as a service attribute, a running status, and computing resource information of the computing service corresponding to each egress CA-UPF, load information of an edge computing node, network cost information, and the like. The network cost information is determined based on factors such as a delay, bandwidth, and jitter between the first CA-UPF and the corresponding egress CA-UPF, and may include one or more specific indicators such as the delay, the bandwidth, and the jitter, or may include a comprehensive indicator determined based on specific indicators such as the delay, the bandwidth, or the jitter.

For example, the first computing service deployed on the edge computing node associated with the second CA-UPF is used as an example. When the first CA-UPF receives the computing service information of the first computing service and the load information of the edge computing node from the second CA-UPF, the first CA-UPF may generate or update computing routing information of the first computing service in the computing routing information base. The computing routing information of the first computing service may include the service identifier of the first computing service, identification information of the second CA-UPF, the computing service information such as the service attribute, the running status, and the computing resource information of the first computing service corresponding to the second CA-UPF, the load information of the edge computing node associated with the second CA-UPF, and the network cost information corresponding to the second CA-UPF.

If another egress CA-UPF corresponding to the first CA-UPF can also provide the first computing service, the computing routing information of the first computing service may further include a set of information corresponding to each of the other egress CA-UPFs that can provide the first computing service, where the set of information includes the computing service information of the first computing service corresponding to the another CA-UPF, load information of an edge computing node associated with the another CA-UPF, network cost information between the first CA-UPF and the another egress CA-UPF, and the like. Certainly, if the first CA-UPF may also be used as an egress CA-UPF, and an edge computing node associated with the first CA-UPF can also provide the first computing service, the computing routing information of the first computing service may also include a set of information corresponding to the first CA-UPF, where the set of information includes the computing service information of the first computing service, load information of the edge computing node associated with the first CA-UPF, and the like.

In this way, when the first CA-UPF receives a service request that is sent by a terminal device and for requesting the first computing service, the first CA-UPF may decide, based on the computing routing information of the first computing service, a corresponding egress CA-UPF to which the service request is forwarded, or decide that the service request is processed by the first CA-UPF.

It may be understood that the computing routing information of the first computing service may be one or more entries that use the service identifier of the first computing service as an index in the computing routing information base. Assuming that the second CA-UPF, a third CA-UPF, and a fourth CA-UPF in the egress CA-UPFs corresponding to the first CA-UPF can provide the first computing service, the computing routing information of the first computing service in the computing routing information base may be represented in a form shown in Table 1 below.

TABLE 1

| Service identifier | Corresponding egress CA-UPF | Computing service information | Network cost information | Load information of an edge computing node |
|---|---|---|---|---|
| Service identifier of a first computing service | Identification information of a second CA-UPF | Service attribute, running status, and computing resource information that correspond to the second CA-UPF | Network cost information related to a delay, bandwidth, and jitter between a first CA-UPF and the second CA-UPF | Load information of an edge computing node associated with the second CA-UPF |
| Service identifier of the first computing service | Identification information of a third CA-UPF | Service attribute, running status, and computing resource information that correspond to the third CA-UPF | Network cost information related to a delay, bandwidth, and jitter between the first CA-UPF and the third CA-UPF | Load information of an edge computing node associated with the third CA-UPF |
| Service identifier of the first computing service | Identification information of a fourth CA-UPF | Service attribute, running status, and computing resource information that correspond to the fourth CA-UPF | Network cost information related to a delay, bandwidth, and jitter between the first CA-UPF and the fourth CA-UPF | Load information of an edge computing node associated with the fourth CA-UPF |
| . . . | . . . | . . . | . . . | . . . |

In some embodiments, the first CA-UPF may further generate, modify, or delete a packet forwarding rule of some service flows based on the computing routing information base. During specific implementation, the computing aware-processing unit in the first CA-UPF may actively request a regional dynamic session processing unit to perform this step, or a regional dynamic session processing unit may be triggered, after receiving a packet in a service data flow from the terminal device, to perform this step. This is not limited.

Step S503: The first CA-UPF may determine one or more service statuses of one or more computing services based on the computing routing information base, and send identification information of the first CA-UPF, and a service identifier and the one or more service statuses of the one or more computing services to an SMF.

The service status indicates whether the computing service is available or unavailable in a regional computing group. The service status is different from a running status in the computing service information. The running status is a status of a service instance of the computing service in a server of a specific edge computing node, and the service status is a status in the regional computing group including a plurality of edge computing nodes.

In some embodiments, the SMF may send the identification information of the first CA-UPF and service identifiers and service statuses of computing services to a CMF, so that the CMF records service statuses of the computing services in a regional computing group that uses the first CA-UPF as an access anchor. After the CMF records the service statuses of the computing services, the service statuses may be used by the terminal device to discover an available computing service. To be specific, before initiating the service request, the terminal device may obtain, from the CMF, a service status corresponding to a to-be-requested computing service, to determine whether the computing service is available in the regional computing group that uses the first CA-UPF as an access anchor.

Figure 10:
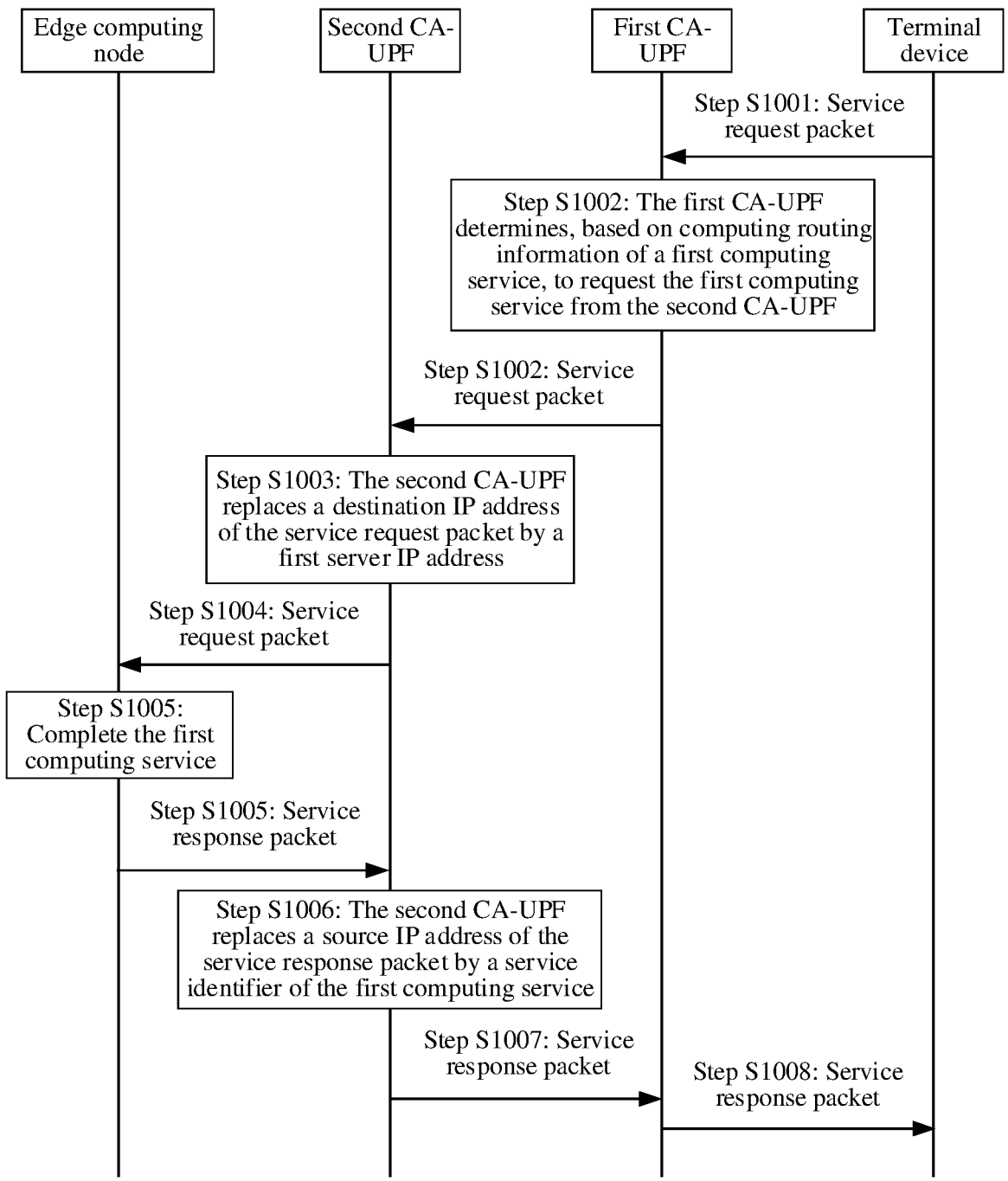
FIG. 10 is a schematic diagram of a user plane packet forwarding process according to an embodiment of this application.

FIG. 10 shows an example of a user plane packet forwarding process according to an embodiment of this application. As shown in FIG. 10, the process includes the following steps.

Step S1001: A terminal device sends a service request packet to a first CA-UPF, where the service request packet carries a service request of the terminal device, the service request is for requesting a first computing service, and the service request includes a service identifier of the first computing service.

Accordingly, the first CA-UPF receives the service request packet from the terminal device.

A source IP address of the service request packet is an IP address of the terminal device, a destination IP address is the service identifier of the first computing service, and the service identifier is an IP anycast address of a special address segment, and is in a one-to-one correspondence with a computing service name.

During specific implementation, the terminal device may select a nearby ingress CA-UPF (for example, the first CA-UPF), and establish, according to a 3GPP standard procedure, a PDU session connected to a DNN, to access a CA-VN. An application layer of the terminal device may send the service request packet to the first CA-UPF by using the PDU session. Therefore, the service request packet may also be referred to as an application layer service request packet.

Step S1002: The first CA-UPF determines, based on computing routing information of the first computing service, to request the first computing service from a second CA-UPF, and sends the service request packet to the second CA-UPF.

Accordingly, the second CA-UPF may receive the service request packet from the first CA-UPF.

During specific implementation, a PDU session processing unit in the first CA-UPF may forward the service request packet to an internal interface corresponding to the CA-VN, and a regional dynamic session processing unit processes the service request packet. After receiving the service request packet, the regional dynamic session processing unit first queries existing packet matching and forwarding rules to determine whether there is a corresponding rule that matches the service request packet. If there is a corresponding rule that matches the service request packet, the regional dynamic session processing unit forwards the service request packet to a corresponding external interface (for example, an N19 interface) after performing tunnel encapsulation on the service request packet according to the matched rule directly, and finally sends the service request packet to the second CA-UPF.

If there is no corresponding rule that matches the service request packet, the regional dynamic session processing unit may send a packet forwarding rule request to a computing aware-processing unit, where the packet forwarding rule request includes information such as the service identifier of the first computing service, data flow information (for example, IP quintuplets) of the service request packet, and a source interface. Further, the computing aware-processing unit may determine the computing routing information of the first computing service in a computing routing information base based on the service identifier of the first computing service and the source interface in the packet forwarding rule request, and select an egress CA-UPF for the first computing service by using a built-in algorithm or policy based on the computing routing information of the first computing service, to indicate requesting the first computing service from the egress CA-UPF. For example, the selected egress CA-UPF is the second CA-UPF. The computing aware-processing unit may generate a packet matching and forwarding rule based on the selected second CA-UPF and the data flow information of the service request packet, determine timer duration corresponding to the packet matching and forwarding rule, and then send a packet forwarding rule response to the regional dynamic session processing unit, where the packet forwarding rule response includes the service identifier of the first computing service, identification information of the selected egress CA-UPF (namely, identification information of the second CA-UPF), the packet matching and forwarding rule, and the timer duration of the packet matching and forwarding rule. It should be noted that if the first CA-UPF may also be used as an egress CA-UPF, and an edge computing node associated with the first CA-UPF can also provide the first computing service, an egress CA-UPF determined by the computing aware-processing unit in the first CA-UPF may alternatively be the first CA-UPF, indicating that the first computing service is requested from the edge computing node associated with the first CA-UPF. In this case, the computing aware-processing unit in the first CA-UPF may forward the service request packet to a local address translation unit for processing. For a specific process, refer to the following related descriptions of an action performed by an address translation unit in the second CA-UPF. Details are not described again.

Further, after receiving the packet forwarding rule response, the regional dynamic session processing unit may add or update the packet matching and forwarding rule to packet matching and forwarding rules corresponding to the second CA-UPF, and start a corresponding timer. The timer is used by the regional dynamic session processing unit to delete the rule from the packet matching and forwarding rules when no matched uplink data flow is detected within specified duration. Further, the regional dynamic session processing unit may forward the service request packet to an external interface (for example, an N19 interface) after performing tunnel encapsulation on the service request packet according to a corresponding packet matching and forwarding rule, and finally send the service request packet to the second CA-UPF.

Step S1003: The second CA-UPF replaces the destination IP address of the service request packet with a first server IP address.

Step S1004: The second CA-UPF sends, to an associated edge computing node, the service request packet whose destination IP address is translated.

During specific implementation, a regional dynamic session processing unit in the second CA-UPF may receive the service request packet from the first CA-UPF, then generate, based on uplink data flow information, a packet matching and forwarding rule corresponding to a downlink data flow, add or update the packet matching and forwarding rule to packet matching and forwarding rules corresponding to the first CA-UPF, and start a timer, where the timer is used by the regional dynamic session processing unit to delete the rule from the packet forwarding rules when no matched downlink data flow is detected within specified duration.

Further, the regional dynamic session processing unit may send the service request packet to the address translation unit, and the address translation unit translates the destination IP address of the service request packet. The address translation unit may query, based on the service identifier of the first computing service in the service request packet, a computing aware-processing unit for a server IP address corresponding to the service identifier of the first computing service. In other words, the address translation unit may obtain a mapping relationship between the service identifier of the first computing service and the first server IP address from the computing aware-processing unit. In this way, the address translation unit may replace the original identifier of the first computing service with the first server IP address for the destination IP address of the service request packet, and then send the service request packet to the associated edge computing node.

Step S1005: After completing the first computing service, the edge computing node sends a service response packet to the second CA-UPF, where a source IP address of the service response packet is the first server IP address, and a destination IP address is the IP address of the terminal device.

Accordingly, the second CA-UPF may receive the service response packet from the edge computing node.

Step S1006: The second CA-UPF replaces the source IP address of the service response packet with the service identifier of the first computing service.

Step S1007: The second CA-UPF sends, to the first CA-UPF, the service response packet whose source IP address is translated.

Accordingly, the first CA-UPF may receive the service response packet from the second CA-UPF.

During specific implementation, the address translation unit in the second CA-UPF may receive the service response packet from the associated edge computing node, replace the original first server IP address with the service identifier of the first computing service for the source IP address of the service response packet based on the mapping relationship between the service identifier of the first computing service and the first server IP address, and then send, to the regional dynamic session processing unit, the service response packet whose source IP address is translated. The regional dynamic session processing unit sends the service response packet to the first CA-UPF according to the corresponding packet forwarding rule.

Step S1008: The first CA-UPF sends the service response packet to the terminal device.

In some embodiments, the computing aware-processing unit in the first CA-UPF may initiate a packet forwarding rule update request to the local regional dynamic session processing unit based on a change of a running status, computing resource information, and the like of a service instance of the first computing service. The request may include the service identifier of the first computing service, identification information of an egress CA-UPF, a data flow forwarding rule, and a corresponding timer, to adjust an egress CA-UPF corresponding to the data flow forwarding rule, so that service experience and load balancing are better ensured.

In some embodiments, ingress CA-UPF handover may occur on a terminal device due to mobility. A computing service in this application may be an edge application constructed by a stateless short-lifecycle microservice or function instance, and does not involve migration of an edge service instance and a status parameter of the edge service instance. Therefore, an ingress CA-UPF handover process may be implemented by using a session management procedure that is based on a session and service continuity (SSC) mode 3.

The SSC mode 3 is the third mode of session and service continuity. The ingress CA-UPF handover based on the SSC mode 3 specifically means that the terminal device first establishes a new session connection to an ingress CA-UPF2, obtains a new IP address of the terminal device, and then releases an old session with an ingress CA-UPF1 and an old IP address of the terminal device. In a deployment scenario of an edge service oriented to statelessness and a short lifecycle, the foregoing ingress CA-UPF handover process based on the SSC mode 3 is used. The ingress CA-UPF handover does not affect routing and service experience of the ingress CA-UPF 1, the ingress CA-UPF 2, and respective neighbor ingress CA-UPFs provided that it is ensured that the PDU session between the terminal device and the ingress CA-UPF 1 is released after a response data flow of a service request that is of the terminal device and that is associated with the old ingress CA-UPF 1 ends.

Figure 11:
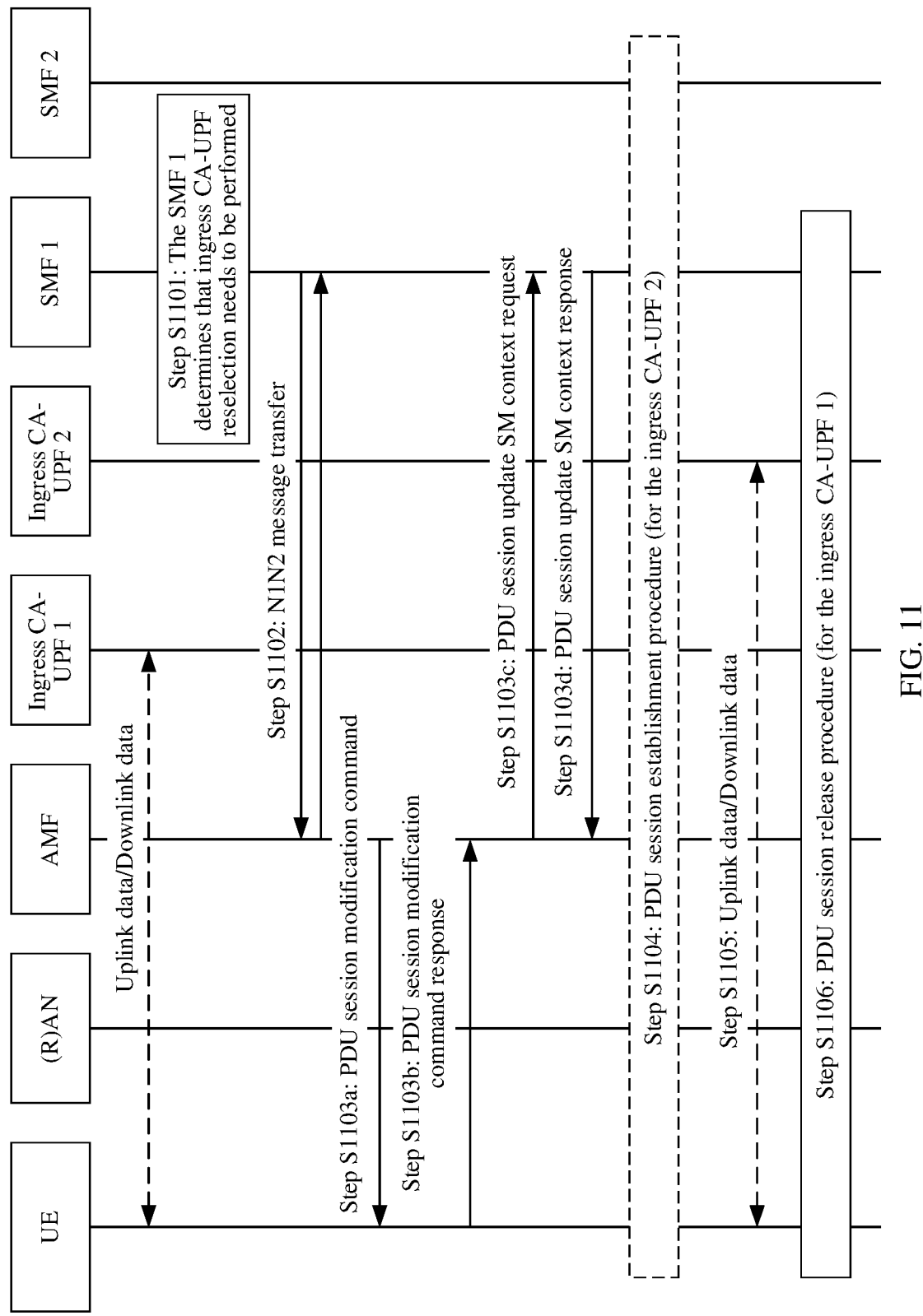
FIG. 11 is a schematic flowchart of performing ingress CA-UPF handover by a terminal device according to an embodiment of this application.

As shown in FIG. 11, an ingress CA-UPF handover process based on an SSC mode 3 may include: before UE is triggered to perform ingress CA-UPF handover, the UE exchanges uplink data/downlink data with an ingress CA-UPF1. In step S1101, an SMF 1 determines that ingress CA-UPF reselection needs to be performed. In step S1102, an AMF and the SMF 1 perform N1N2 message transfer. In step S1103a, the AMF sends a PDU session modification command to the UE. In step S1103b, the UE sends a PDU session modification command response to the AMF. In step S1103c, the AMF sends a PDU session update session management (SM) context request to the SMF 1. In step S1103d, the SMF 1 sends a PDU session update SM context response to the AMF. In step S1104, a PDU session establishment procedure for an ingress CA-UPF 2 is performed. In step S1105, the UE exchanges uplink data/downlink data with the ingress CA-UPF 2. In step S1106, a PDU session release procedure for the ingress CA-UPF 1 is performed.

Figure 12:
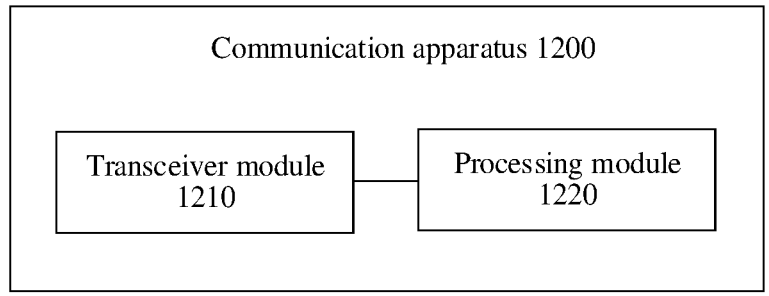
FIG. 12 is a schematic diagram of a structure of a communication apparatus according to an embodiment of this application.

An embodiment of this application further provides a communication apparatus. FIG. 12 is a schematic diagram of a structure of a communication apparatus according to an embodiment of this application. The communication apparatus 1200 includes a transceiver module 1210 and a processing module 1220. The communication apparatus may be configured to implement a function related to a computing management function, a session management function, or a computing aware-user plane function in any one of the foregoing method embodiments. For example, the communication apparatus may be a network device, or may be a chip included in the network device.

For example, when the communication apparatus performs an operation or a step corresponding to the computing management function in the method embodiment shown in FIG. 2A and FIG. 2B, the transceiver module 1210 is configured to receive a first request message, where the first request message is for creating a computing aware-virtual network, the computing aware-virtual network includes N computing aware-user plane functions, the first request message includes a member list of the computing aware-virtual network, and the member list includes identification information of the N computing aware-user plane functions. The processing module 1220 is configured to generate a forwarding neighbor list for a first computing aware-user plane function, where the first computing aware-user plane function is one of the N computing aware-user plane functions, the forwarding neighbor list includes identification information of L egress computing aware-user plane functions corresponding to the first computing aware-user plane function, and N and L are positive integers. The transceiver module 1210 is further configured to send a second request message to a session management function, where the second request message is for requesting to create forwarding paths in the computing aware-virtual network, and the second request message includes the member list of the computing aware-virtual network and the forwarding neighbor list of the first computing aware-user plane function.

In some embodiments, the first request message includes identification information of the computing aware-virtual network, and the identification information includes one or more of an identity of the computing aware-virtual network, a data network name of the computing aware-virtual network, network slice information of the computing aware-virtual network, or an application descriptor of the computing aware-virtual network.

In some embodiments, the processing module 1220 is further configured to generate an advertisement neighbor list for a second computing aware-user plane function, where the second computing aware-user plane function is one of the N computing aware-user plane functions, the advertisement neighbor list includes identification information of K ingress computing aware-user plane functions corresponding to the second computing aware-user plane function, and K is a positive integer, where the second request message further includes the advertisement neighbor list of the second computing aware-user plane function.

In some embodiments, the transceiver module 1210 is further configured to receive a fifth request message, where the fifth request message is for requesting to update the computing aware-virtual network, the fifth request message includes a to-be-added-member list of the computing aware-virtual network, and the to-be-added-member list includes identification information of one or more computing aware-user plane functions that need to be added to the computing aware-virtual network. The processing module 1220 is further configured to determine, based on the to-be-added-member list, a to-be-affected-member list and M computing aware-user plane functions included in an updated computing aware-virtual network, where the to-be-affected-member list includes identification information of one or more computing aware-user plane functions, a forwarding neighbor list or an advertisement neighbor list of each of the one or more computing aware-user plane functions needs to be updated, and M is a positive integer. The processing module 1220 is further configured to update a forwarding neighbor list or an advertisement neighbor list for a third computing aware-user plane function in the to-be-affected-member list. The transceiver module 1210 is further configured to send a sixth request message to the session management function, where the sixth request message is for requesting to update the forwarding paths in the computing aware-virtual network, and the sixth request message includes the to-be-affected-member list and an updated forwarding neighbor list or advertisement neighbor list of the third computing aware-user plane function.

In some embodiments, the transceiver module 1210 is further configured to receive a fifth request message, where the fifth request message is for requesting to update the computing aware-virtual network, the fifth request message includes a to-be-deleted-member list of the computing aware-virtual network, and the to-be-deleted-member list includes identification information of one or more computing aware-user plane functions that need to be deleted from the computing aware-virtual network. The processing module 1220 is further configured to determine, based on the to-be-deleted-member list, a to-be-affected-member list and M computing aware-user plane functions included in an updated computing aware-virtual network, where the to-be-affected-member list includes identification information of one or more computing aware-user plane functions, a forwarding neighbor list or an advertisement neighbor list of each of the one or more computing aware-user plane functions needs to be updated, and M is a positive integer. The processing module 1220 is further configured to update a forwarding neighbor list or an advertisement neighbor list for a third computing aware-user plane function in the to-be-affected-member list. The transceiver module 1210 is further configured to send a sixth request message to the session management function, where the sixth request message is for requesting to update the forwarding paths in the computing aware-virtual network, and the sixth request message includes the to-be-affected-member list and an updated forwarding neighbor list or advertisement neighbor list of the third computing aware-user plane function.

When the communication apparatus performs an operation or a step corresponding to the session management function in the method embodiment shown in FIG. 2A and FIG. 2B, the transceiver module 1210 is configured to receive a second request message from a computing management function, where the second request message is for requesting to create forwarding paths in a computing aware-virtual network, the computing aware-virtual network includes N computing aware-user plane functions, the second request message includes a member list of the computing aware-virtual network and a forwarding neighbor list of a first computing aware-user plane function, the member list includes identification information of the N computing aware-user plane functions, the first computing aware-user plane function is one of the N computing aware-user plane functions, the forwarding neighbor list includes identification information of L egress computing aware-user plane functions corresponding to the first computing aware-user plane function, and N and L are positive integers. The processing module 1220 is configured to send a third request message to the first computing aware-user plane function via the transceiver module 1210 based on the member list, where the third request message is for requesting to create a virtual-network-level session of the first computing aware-user plane function, and the third request message includes identification information of the computing aware-virtual network and the forwarding neighbor list of the first computing aware-user plane function.

In some embodiments, the processing module 1220 is further configured to generate, based on the forwarding neighbor list of the first computing aware-user plane function, forwarding tunnel information corresponding to the first computing aware-user plane function and a second computing aware-user plane function, where the forwarding tunnel information is for establishing a forwarding tunnel between the first computing aware-user plane function and the second computing aware-user plane function, and the L egress computing aware-user plane functions include the second computing aware-user plane function, where the third request message further includes the forwarding tunnel information.

In some embodiments, the second request message further includes an advertisement neighbor list of the second computing aware-user plane function, the second computing aware-user plane function is one of the N computing aware-user plane functions, the advertisement neighbor list includes identification information of K ingress computing aware-user plane functions corresponding to the second computing aware-user plane function, and K is a positive integer; and the transceiver module 1210 is further configured to send a fourth request message to the second computing aware-user plane function, where the fourth request message is for requesting to create a virtual-network-level session of the second computing aware-user plane function, and the fourth request message includes the advertisement neighbor list of the second computing aware-user plane function.

In some embodiments, the processing module 1220 is further configured to generate forwarding tunnel information based on the advertisement neighbor list of the second computing aware-user plane function, where the forwarding tunnel information is for establishing a forwarding tunnel between the second computing aware-user plane function and the first computing aware-user plane function, and the K ingress computing aware-user plane functions include the first computing aware-user plane function, where the fourth request message further includes the forwarding tunnel information.

In some embodiments, the transceiver module 1210 is further configured to receive a sixth request message from the computing management function, where the sixth request message is for requesting to update the forwarding paths in the computing aware-virtual network, and the sixth request message includes a to-be-affected-member list of the computing aware-virtual network and an updated forwarding neighbor list or advertisement neighbor list of a third computing aware-user plane function in the to-be-affected-member list. The transceiver module 1210 is further configured to send a seventh request message to the third computing aware-user plane function, where the seventh request message is for requesting to update a virtual-network-level session of the third computing aware-user plane function, and the seventh request message includes the updated forwarding neighbor list or advertisement neighbor list of the third computing aware-user plane function.

When the communication apparatus performs an operation or a step corresponding to the first computing aware-user plane function in the method embodiment shown in FIG. 2A and FIG. 2B, the transceiver module 1210 is configured to receive a third request message from a session management function, where the third request message is for requesting to create a virtual-network-level session of the first computing aware-user plane function, the third request message includes identification information of a computing aware-virtual network and a forwarding neighbor list of the first computing aware-user plane function, the computing aware-virtual network includes N computing aware-user plane functions, the first computing aware-user plane function is one of the N computing aware-user plane functions, the forwarding neighbor list includes identification information of L egress computing aware-user plane functions corresponding to the first computing aware-user plane function, and N and L are positive integers. The processing module 1220 is configured to establish forwarding tunnels between the first computing aware-user plane function and the L corresponding egress computing aware-user plane functions based on the forwarding neighbor list.

In some embodiments, the third request message further includes forwarding tunnel information corresponding to the first computing aware-user plane function and a second computing aware-user plane function, and the L egress computing aware-user plane functions include the second computing aware-user plane function. The processing module 1220 is specifically configured to establish a forwarding tunnel between the first computing aware-user plane function and the second computing aware-user plane function based on the forwarding tunnel information.

When the communication apparatus performs an operation or a step corresponding to the second computing aware-user plane function in the method embodiment shown in FIG. 2A and FIG. 2B, the transceiver module 1210 is configured to receive a fourth request message from a session management function, where the fourth request message is for requesting to create a virtual-network-level session of the second computing aware-user plane function, the fourth request message includes identification information of a computing aware-virtual network and an advertisement neighbor list of the second computing aware-user plane function, the computing aware-virtual network includes N computing aware-user plane functions, the second computing aware-user plane function is one of the N computing aware-user plane functions, the advertisement neighbor list includes identification information of K ingress computing aware-user plane functions corresponding to the second computing aware-user plane function, and N and K are positive integers. The processing module 1220 is configured to establish advertisement forwarding relationships between the second computing aware-user plane function and the K corresponding ingress computing aware-user plane functions based on the advertisement neighbor list.

In some embodiments, the fourth request message further includes forwarding tunnel information corresponding to the second computing aware-user plane function and a first computing aware-user plane function, and the K ingress computing aware-user plane functions include the first computing aware-user plane function. The processing module 1220 is further configured to establish a forwarding tunnel between the second computing aware-user plane function and the first computing aware-user plane function based on the forwarding tunnel information.

When the communication apparatus performs an operation or a step corresponding to the second computing aware-user plane function in the method embodiment shown in FIG. 4, the transceiver module 1210 is configured to send computing service information to a first computing aware-user plane function, where the computing service information indicates that an edge computing node associated with the second computing aware-user plane function supports a first computing service. The transceiver module 1210 is further configured to receive a service request packet from the first computing aware-user plane function, where the service request packet is for requesting the first computing service. The processing module 1220 is configured to send the service request packet to the edge computing node via the transceiver module 1210.

In some embodiments, the transceiver module 1210 is further configured to receive an advertisement neighbor list from a session management function, where the advertisement neighbor list includes K ingress computing aware-user plane functions corresponding to the second computing aware-user plane function, K is a positive integer, and the K ingress computing aware-user plane functions include the first computing aware-user plane function.

In some embodiments, the processing module 1220 is specifically configured to send the computing service information to the first computing aware-user plane function via the transceiver module 1210 based on the advertisement neighbor list.

In some embodiments, the transceiver module 1210 is further configured to receive, from the edge computing node, a service identifier of the first computing service and a first server IP address corresponding to the service identifier of the first computing service, where the first server IP address is an IP address of a server running the first computing service on the edge computing node. The processing module 1220 is specifically configured to replace the service identifier of the first computing service with the first server IP address, where the service identifier of the first computing service is carried in the service request packet; and then send, to the edge computing node via the transceiver module 1210, the service request packet that carries the first server IP address.

In some embodiments, the transceiver module 1210 is further configured to receive, from the edge computing node, a service response packet that carries the first server IP address. The processing module 1220 is further configured to: replace the first server IP address in the service response packet with the service identifier of the first computing service; and then send, to the first computing aware-user plane function via the transceiver module 1210, the service response packet that carries the service identifier of the first computing service.

In some embodiments, the transceiver module 1210 is further configured to receive the computing service information from the edge computing node.

In some embodiments, the computing service information includes the service identifier of the first computing service, a service attribute of the first computing service, and a running status of the first computing service and computing resource information of the first computing service.

In some embodiments, the transceiver module 1210 is further configured to receive load information from the edge computing node; and send the load information to the first computing aware-user plane function.

When the communication apparatus performs an operation or a step corresponding to the first computing aware-user plane function in the method embodiment shown in FIG. 4, the transceiver module 1210 is configured to receive computing service information from a second computing aware-user plane function, where the computing service information indicates that an edge computing node associated with the second computing aware-user plane function supports a first computing service. The processing module 1220 is configured to send a service request packet to the second computing aware-user plane function via the transceiver module 1210 based on the computing service information, where the service request packet is for requesting the first computing service.

In some embodiments, the transceiver module 1210 is further configured to receive a forwarding neighbor list from a session management function, where the forwarding neighbor list includes L egress computing aware-user plane functions corresponding to the first computing aware-user plane function, L is a positive integer, and the L egress computing aware-user plane functions include the second computing aware-user plane function.

In some embodiments, the transceiver module 1210 is further configured to receive the service request packet from a terminal device.

In some embodiments, the transceiver module 1210 is further configured to receive load information from the second computing aware-user plane function.

In some embodiments, the processing module 1220 is further configured to determine, based on the computing service information and the load information, to send the service request packet to the second computing aware-user plane function.

In some embodiments, the transceiver module 1210 is further configured to send the service request packet to the second computing aware-user plane function according to a packet matching and forwarding rule corresponding to the second computing aware-user plane function.

In some embodiments, the computing service information includes a service identifier of the first computing service, a service attribute of the first computing service, and a running status of the first computing service and computing resource information of the first computing service.

The processing module 1220 in the communication apparatus may be implemented by at least one processor or processor-related circuit component, and the transceiver module 1210 may be implemented by at least one transceiver, transceiver-related circuit component, or communication interface. Operations and/or functions of the modules in the communication apparatus are separately for implementing corresponding procedures of the methods shown in FIG. 2A to FIG. 11. For brevity, details are not described herein again. In some embodiments, the communication apparatus may further include a storage module. The storage module may be configured to store data and/or instructions. The transceiver module 1210 and/or the processing module 1220 may read the data and/or the instructions in the storage module, so that the communication apparatus implements a corresponding method. For example, the storage module may be implemented by using at least one memory.

The storage module, the processing module, and the transceiver module may exist separately, or all or some of the modules may be integrated. For example, the storage module and the processing module are integrated, or the processing module and the transceiver module are integrated.

Figure 13:
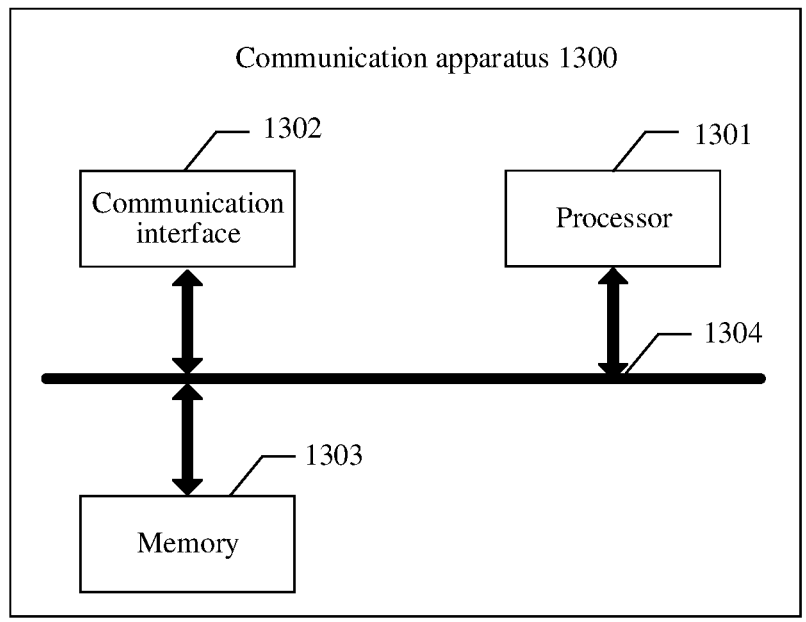
FIG. 13 is another schematic diagram of a structure of a communication apparatus according to an embodiment of this application.

FIG. 13 is another schematic diagram of a structure of a communication apparatus according to an embodiment of this application. The communication apparatus may be configured to implement a function corresponding to the computing management function, the session management function, or the computing aware-user plane function in the foregoing method embodiments. The communication apparatus may be a network device, an apparatus that can support the network device in implementing a corresponding function in the foregoing method embodiments, or the like.

The communication apparatus 1300 may include a processor 1301, a communication interface 1302, and a memory 1303. The communication interface 1302 is configured to communicate with another device through a transmission medium. The communication interface 1302 may be a transceiver, or may be an interface circuit such as a transceiver circuit or a transceiver chip. The memory 1303 is configured to store program instructions and/or data. The processor 1301 is configured to execute the program instructions stored in the memory 1303, to implement the methods in the foregoing method embodiments. In some embodiments, the memory 1303 and the processor 1301 are coupled. The coupling is indirect coupling or a communication connection between apparatuses, units, or modules, may be in an electrical form, a mechanical form, or another form, and is for information exchanges between the apparatuses, the units, or the modules.

In an embodiment, the communication interface 1302 may be specifically configured to perform an action of the transceiver module 1210, and the processor 1301 may be specifically configured to perform an action of the processing module 1220. Details are not described herein again in this application.

In this embodiment of this application, a specific connection medium between the communication interface 1302, the processor 1301, and the memory 1303 is not limited. In this embodiment of this application, the memory 1303, the processor 1301, and the communication interface 1302 are connected through a bus 1304 in FIG. 13, and the bus is represented by a thick line in FIG. 13. A manner of a connection between other components is merely schematically described, and is not limited thereto. Buses may be classified into an address bus, a data bus, a control bus, and the like. For ease of representation, only one thick line is for representing the bus in FIG. 13, but this does not mean that there is only one bus or only one type of bus.

An embodiment of this application further provides a chip system, including a processor. The processor is coupled to a memory. The memory is configured to store a program or instructions. When the program or the instructions are executed by the processor, the chip system is enabled to implement the method corresponding to the terminal device or the method corresponding to the network device in any one of the foregoing method embodiments.

In some embodiments, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

In some embodiments, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated on a same chip, or may be separately disposed on different chips. A type of the memory and a manner of disposing the memory and the processor are not specifically limited in this application.

For example, the chip system may be a field programmable gate array (FPGA), an application specific integrated circuit (ASIC), a system on chip (SoC), a central processing unit (CPU), a network processor (NP), a digital signal processor (DSP), a micro controller unit (MCU), a programmable logic device (PLD), or another integrated chip.

It should be understood that steps in the foregoing method embodiments may be implemented by using a hardware integrated logical circuit in the processor or instructions in a form of software. The steps of the methods disclosed with reference to embodiments of this application may be directly performed and completed by a hardware processor, or may be performed and completed by using a combination of hardware in the processor and a software module.

An embodiment of this application further provides a computer-readable storage medium. The computer storage medium stores computer-readable instructions. When the computer-readable instructions are read and executed on a computer, the computer is enabled to perform the method in any one of the foregoing method embodiments.

An embodiment of this application further provides a computer program product. When the computer program product is read and executed on a computer, the computer is enabled to perform the method in any one of the foregoing method embodiments.

An embodiment of this application further provides a communication system. The communication system includes a computing management function, a session management function, and N computing aware-user plane functions. A computing aware-virtual network includes the N computing aware-user plane functions.

In some embodiments, the communication system further includes a terminal device. The terminal device may be connected to at least one of the N computing aware-user plane functions. In some embodiments, the communication system may further include at least one edge computing node. A regional computing group may include the at least one edge computing node. One or more of the N computing aware-user plane functions may be connected to the edge computing node.

It should be understood that the processor mentioned in embodiments of this application may be a CPU, or may be another general-purpose processor, a DSP, an ASIC, an FPGA or another programmable logic device, a discrete gate or a transistor logic device, a discrete hardware component, or the like. The general-purpose processor may be a microprocessor, or the processor may be any processor or the like.

It should be further understood that the memory mentioned in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that, when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory in this specification aims to include but is not limited to these memories and any memory of another appropriate type.

It should be understood that numbers in various embodiments of this application are merely for differentiation for ease of description. Sequence numbers of the foregoing processes or steps do not mean execution sequences. The execution sequences of the processes or steps should be determined based on functions and internal logic of the processes or steps, and should not constitute any limitation on the implementation processes of embodiments of the present disclosure.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the functions for all particular applications, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, namely, may be located at one location, or may be distributed on a plurality of network units. Some or all of the units may be selected based on an actual requirement to achieve the objectives of the solutions in embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions in this application essentially, or the part contributing to some approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes any medium that can store program code, such as a universal serial bus (USB) flash drive, a removable hard disk, a ROM, a RAM, a magnetic disk, or an optical disc.

In embodiments of this application, unless otherwise stated or there is a logic conflict, terms and/or descriptions between different embodiments are consistent and may be mutually referenced, and technical features in the different embodiments may be combined based on an internal logical relationship thereof, to form a new embodiment.

What is claimed is:

1. A computing aware-session management method, wherein the method comprises:
   sending, by a second computing aware-user plane function, computing service information to a first computing aware-user plane function, wherein the computing service information is useable to indicate that an edge computing node associated with the second computing aware-user plane function is configured to support a first computing service;
   receiving, by the second computing aware-user plane function, a service request packet from the first computing aware-user plane function, wherein the service request packet is useable for requesting the first computing service; and
   sending, by the second computing aware-user plane function, the service request packet to the edge computing node.

2. The method according to claim 1, wherein the method further comprises:
   receiving, by the second computing aware-user plane function, an advertisement neighbor list from a session management function, wherein the advertisement neighbor list comprises K ingress computing aware-user plane functions corresponding to the second computing aware-user plane function, where K is a positive integer, and the K ingress computing aware-user plane functions comprise the first computing aware-user plane function.

3. The method according to claim 2, wherein the sending, by the second computing aware-user plane function, computing service information to the first computing aware-user plane function comprises:
   sending, by the second computing aware-user plane function, the computing service information to the first computing aware-user plane function based on the advertisement neighbor list.

4. The method according to claim 1, wherein each of the second computing aware-user plane function and the first computing aware-user plane function are located in a computing aware—virtual network.

5. The method according to claim 1, wherein the method further comprises:
   receiving, by the second computing aware-user plane function from the edge computing node, a service identifier of the first computing service and a first server internet protocol (IP) address corresponding to the service identifier of the first computing service, wherein the first server IP address is an IP address of a server configured to run the first computing service on the edge computing node; and
   the sending, by the second computing aware-user plane function, the service request packet to the edge computing node comprises:
      replacing, by the second computing aware-user plane function, the service identifier of the first computing service with the first server IP address, wherein the service identifier of the first computing service is included in the service request packet; and
      sending, by the second computing aware-user plane function to the edge computing node, the service request packet that includes the first server IP address.

6. The method according to claim 5, wherein the method further comprises:
   receiving, by the second computing aware-user plane function from the edge computing node, a service response packet that includes the first server IP address;
   replacing, by the second computing aware-user plane function, the first server IP address with the service identifier of the first computing service; and
   sending, by the second computing aware-user plane function to the first computing aware— user plane function, the service response packet that includes the service identifier of the first computing service.

7. The method according to claim 1, wherein the method further comprises:
   receiving, by the second computing aware-user plane function, the computing service information from the edge computing node.

8. The method according to claim 1, wherein the computing service information comprises a service identifier of the first computing service, a service attribute of the first computing service, a running status of the first computing service and computing resource information of the first computing service.

9. The method according to claim 1, wherein the method further comprises:

receiving, by the second computing aware-user plane function, load information from the edge computing node; and sending, by the second computing aware-user plane function, the load information to the first computing aware-user plane function.

10. A computing aware-session management method, wherein the method comprises:

receiving, by a first computing aware-user plane function, computing service information from a second computing aware-user plane function, wherein the computing service information is useable to indicate that an edge computing node associated with the second computing aware-user plane function is configured to support a first computing service; and sending, by the first computing aware-user plane function, a service request packet to the second computing aware-user plane function based on the computing service information, wherein the service request packet is useable for requesting the first computing service.

11. The method according to claim 10, wherein the method further comprises:

receiving, by the first computing aware-user plane function, a forwarding neighbor list from a session management function, wherein the forwarding neighbor list comprises L egress computing aware-user plane functions corresponding to the first computing aware-user plane function, where L is a positive integer, and the L egress computing aware-user plane functions comprise the second computing aware-user plane function.

12. The method according to claim 10, wherein each of the first computing aware-user plane function and the second computing aware-user plane function are located in a computing aware—virtual network.

13. The method according to claim 10, wherein the method further comprises:

receiving, by the first computing aware-user plane function, the service request packet from a terminal device.

14. The method according to claim 10, wherein the method further comprises:

receiving, by the first computing aware-user plane function, load information from the second computing aware-user plane function.

15. The method according to claim 14, wherein the method further comprises:

determining, by the first computing aware-user plane function based on the computing service information and the load information, to send the service request packet to the second computing aware-user plane function.

16. The method according to claim 10, wherein the method further comprises:

sending, by the first computing aware-user plane function, the service request packet to the second computing aware-user plane function according to a packet matching and forwarding rule corresponding to the second computing aware-user plane function.

17. The method according to claim 10, wherein the computing service information comprises a service identifier of the first computing service, a service attribute of the first computing service, a running status of the first computing service and computing resource information of the first computing service.

18. A communication apparatus, wherein the apparatus comprises:

at least one processor coupled to at least one memory; and the at least one memory being configured to store non-transitory instructions, and the at least one processor being configured to execute the non-transitory instructions thereby causing the apparatus to perform operations comprising:

sending computing service information to a first computing aware-user plane function, wherein the computing service information is useable to indicate that an edge computing node associated with the second computing aware-user plane function is configured to support a first computing service;

receiving a service request packet from the first computing aware-user plane function, wherein the service request packet is useable for requesting the first computing service; and sending the service request packet to the edge computing node.

19. The communication apparatus according to claim 18, wherein the at least one processor being further configured to further execute the non-transitory instructions thereby further causing the apparatus to perform operations further comprising:

receiving, from the edge computing node, a service identifier of the first computing service and a first server internet protocol (IPS address corresponding to the service identifier of the first computing service, wherein the first server IP address is an IP address of a server configured to run the first computing service on the edge computing node; and the sending the service request packet to the edge computing node comprises:

replacing the service identifier of the first computing service with the first server IP address, wherein the service identifier of the first computing service is included in the service request packet; and sending, to the edge computing node, the service request packet that includes the first server IP address.

20. The communication apparatus according to claim 19, wherein the at least one processor being further configured to further execute the non-transitory instructions thereby further causing the apparatus to perform operations further comprising:

receiving, from the edge computing node, a service response packet that includes the first server IP address;

replacing the first server IP address with the service identifier of the first computing service; and sending, to the first computing aware-user plane function, the service response packet that includes the service identifier of the first computing service.

* * * * *